(12) United States Patent
Shah et al.

(10) Patent No.: US 10,825,080 B2
(45) Date of Patent: Nov. 3, 2020

(54) ITEM DATABASE CREATION BASED ON NEGOTIATED VALUES

(71) Applicant: Target Brands, Inc., Minneapolis, MN (US)

(72) Inventors: Jayesh Shah, Shoreview, MN (US); Jayabarathi Ramanathan, Minneapolis, MN (US); Prakash Govindrao, Maple Grove, MN (US); Rory Lander, Maple Grove, MN (US); Chennupati ChandraMohan, Plymouth, MN (US); Brian Rooney, St. Paul, MN (US); Jon Olson, Minnetonka, MN (US); Dave Harkenrider, Shakopee, MN (US); Raghunandan Muralidhar, Eden Prairie, MN (US)

(73) Assignee: Target Brands, Inc., Minneapolis, MN (US)

( * ) Notice: Subject to any disclaimer, the term of this patent is extended or adjusted under 35 U.S.C. 154(b) by 292 days.

(21) Appl. No.: 15/963,723

(22) Filed: Apr. 26, 2018

(65) Prior Publication Data

US 2018/0315113 A1 Nov. 1, 2018

Related U.S. Application Data

(60) Provisional application No. 62/490,748, filed on Apr. 27, 2017.

(51) Int. Cl.
*G06F 16/23* (2019.01)
*G06Q 30/06* (2012.01)
(Continued)

(52) U.S. Cl.
CPC ..... *G06Q 30/0641* (2013.01); *G06F 16/2343* (2019.01); *G06F 16/2428* (2019.01); *G06Q 30/0633* (2013.01); *G06Q 30/08* (2013.01)

(58) Field of Classification Search
CPC .................. G06Q 30/00; G06F 16/23
See application file for complete search history.

(56) References Cited

U.S. PATENT DOCUMENTS 5,581,750 A * 12/1996 Haderle .............. G06F 11/1471
6,240,413 B1 * 5/2001 Learmont ................. G06F 8/65
707/698

(Continued)

OTHER PUBLICATIONS

Oracle, Oracle Sourcing Guide, Buyers—Using the negotiations help page, Oracle Help Center, dated Nov. 7, 2013. (Year: 2013).*

(Continued)

*Primary Examiner* — Mark A Fadok
(74) *Attorney, Agent, or Firm* — Theodore M. Magee; Westman, Champlin & Koehler, P.A.

(57) ABSTRACT

A computer-implemented method includes receiving a plurality of attribute headings for a product and storing the product and the associated attribute headings as part of a negotiation. A request for products associated with the negotiation is received and in response, a user interface listing at least one of the attribute headings for the product and providing controls for entering an attribute value for the listed at least one attribute heading is generated and transmitted. An attribute value for the listed attribute heading is received as part of a bid during the negotiation and is stored. An indication that the negotiation is complete is received and in response, the attribute value for the listed attribute heading is locked. An instruction to create a new item in an item database is received and in response to the received instruction, a request is sent to retrieve the locked attribute (Continued)

value and store the locked attribute value in an item database used by retail systems to acquire information about products for sale in a retail enterprise.

20 Claims, 29 Drawing Sheets

(51) Int. Cl.
  *G06Q 30/08* (2012.01)
  *G06F 16/242* (2019.01)

(56) References Cited

U.S. PATENT DOCUMENTS

| | | | | |
|---|---|---|---|---|
| 8,745,707 | B2* | 6/2014 | Sadjadi | G06F 16/2343 726/6 |
| 2004/0139116 | A1* | 7/2004 | Porter | G06F 16/23 |
| 2005/0138375 | A1* | 6/2005 | Sadjadi | G06F 16/2343 713/167 |
| 2009/0043685 | A1* | 2/2009 | Benjamin | G06Q 30/08 705/37 |
| 2011/0040646 | A1* | 2/2011 | Davis | G06Q 30/00 705/26.3 |
| 2011/0071920 | A1* | 3/2011 | Davis | G06Q 30/00 705/26.35 |
| 2011/0106683 | A1* | 5/2011 | Davis | G06Q 30/00 705/37 |
| 2013/0173567 | A1* | 7/2013 | Onsgard | G06F 16/2343 707/704 |
| 2013/0297439 | A1* | 11/2013 | Chanoine | G06Q 30/0641 705/26.3 |
| 2014/0074646 | A1* | 3/2014 | Ozonat | G06Q 30/06 705/26.4 |

OTHER PUBLICATIONS

ProgrammerInterview.com, Database Locking—Programmer and Software Interview Questions and Answers, dated Jun. 2, 2013. (Year: 2013).*

* cited by examiner

| VIEW EVENTS | | | | |
|---|---|---|---|---|
| EVENTS NAME | ID | # OF VENDORS | # OF BIDS READY FOR REVIEW | ACTION |
| TESTEVENT | 74 | 2 | 0 | |

COPY EVENT ×
BABYEVENT  9/30 — 302
SUBMIT — 304

≡ NEGOTIATION EVENTS > NEGOTIATION EVENTS > ADD PRODUCT

ADD PRODUCT ← BACK

ADD PRODUCT    ADD CUSTOM ATTRIBUTES

● NEW ITEM   ○ MIC   ○ DPCI    ⋯

DEPARTMENT*   CLASS*   ENTER # OF PRODUCTS*   SELECT A PLAN* ▶

— 506      — 508        — 510

BUSINESS PARTNERS

| | BP NAME | BP # |
|---|---|---|
| ☐ | SLOW GOLF | 6685 |
| ☐ | CHALLENGE GOLF | 639 |
| ☐ | | |

[ ADD PRODUCT ]
— 512

500, 502, 504

≡ ADD PRODUCT

ADD PRODUCT

ADD PRODUCT          ADD CUSTOM ATTRIBUTES

○ NEW ITEM          ○ MIC          ● DPCI

DEPARTMENT*          CLASS*          ITEM #
007                  09              0027
                     ╰906           ╰908
                  ╰902

VENDORS 904

| VENDOR NAME | VENDOR # |
|---|---|
| CHANCE GOLF | 202195 |
| RIVER GOLF & BANQUET | 345182 |

ADD PRODUCT ── 910

900 (screen)

≡ ADD PRODUCT

REVIEW PRODUCTS   ADD PRODUCT   ADD ATTRIBUTES   ADD CUSTOM ATTRIBUTES

← BACK

DEFAULT VIEW ▼

⩭ FILTERS 6/6   ✎ BULK UPDATE   ↶ UNDO   ↷ REDO

1101

| SELECT | BUYERS CHOICE | EXPOSE TO BP | PRODUCT DESC. | DEPT | CF/NEW | FACTORY/NAME/ FACTORY ID | AVERAGE FIRST COST (US) |
|---|---|---|---|---|---|---|---|
| ☐ | ☐ | ☒ | 9.1 WORK WEAR JACKET | 331 | NEW | | $15.75 |
| ☐ | ☐ | ☒ | 9.1 CORDUROY JACKET | 331 | NEW | | $16.95 |
| ☐ | ☐ | ☒ | 9.1 DENIM OVERALL DRESS | 331 | NEW | | $13.50 |
| ☐ | ☐ | ☒ | 9.1 BLACK DENIM JACKET | 331 | NEW | | $15.50 |
| ☐ | ☐ | ☒ | 9.1 CF OVERSIZED CROPPED DENIM JACKET | 331 | NEW | | $13.50 |
| ☐ | ☐ | ☒ | 9.1 CF ACID WASH BASIC TRUCKER JACKET | 331 | CF | WUHU HUAYANG CLOTHING CO. LTD. /16853406 PT SUKWANG INDONESIA/16835198 QINGDAO TONEMILAN APPAREL CO., LTD/16910094 NAMYANG SONG MAY CO., LTD/ 1681217 IVORY VIETNAM-THANHHOA CO., LTD./16904402 | .50 |

| DELETED PRODUCT | FEEDBACK | VENDOR | ITEM DESC. | DEPT | CLASS | CF/ BRAND | BRAND | GUEST FACING BRAND | ITEM TYPE ID | SHIPPING POINT (US) | IMPORT DESIGN. |
|---|---|---|---|---|---|---|---|---|---|---|---|
| ☐ | ▷ | 348182 | 1 | 1 | NEW | NEW | | | | | |
| ☐ | ▷ | 348182 | 1 | 1 | NEW | NEW | | | | | |
| ☐ | ▷ | 348182 | 1 | 1 | NEW | NEW | | | | | |

NEGOTIATION EVENTS > NEGOTIATION EVENTS > D30_FALL_EVENT

SELECT ATTRIBUTE

- ☐ PATTERN
- ☐ LAUNCH DATE
- ☑ QUARTER

SHIPPING LOCATION:
- ☐ SHIPPING POINT (US)
- ☐ FACTORY NAME/FACTORY ID

US PRODUCT COUNTING NEGOTIATION ATTRIBUTES:
- ☐ FCA FACTORY CITY UNIT COST (US)
- ☐ DVS COST (US)
- ☑ MSRP
- ☐ SPECIFIC DUTY (US)
- ☐ ROYALTY DUTY FLAG
- ☐ SUBSCRIPTION ELIGIBLE
- ☐ REGULAR DAYS TO PAY

US PRODUCT UNITS
- ☐ EST STORE COUNT (US)

US PRODUCT UNITS:
- ☐ EST STORE COUNT (US)

- ☐ SIZE
- ☑ STORE SET DATE
- ☑ PROP 65 (Y/N)

- ☐ PORT OF EXPORT
- ☐ COUNTRY OF ORIGIN

- ☑ PORT OF EXPORT UNIT COST (US)
- ☑ FIRST COST (US)
- ☐ VENDOR TERMS
- ☐ RETURN POLICY
- ☐ TRADEMARK
- ☐ PRICING STRATEGY
- ☐ NEW STORE DAYS TO PAY

- ☐ EST UNITS PER STORE PER WEEK (US)

- ☑ EFFECTIVE DATE
- ☑ DEVELOPMENT CYCLE

- ☐ VENDOR ORDER POINT (S)-VOS  ← 1902

- ☑ COLLECTION DOMESTIC UNIT COST (US)
- ☐ MAP
- ☐ DUTY RATE % (US)
- ☐ ROYALTY DUTY %
- ☐ BASIC WARRANTY
- ☐ REGULAR DISCOUNT %
- ☐ NEW STORE DESCRIPTION

- ☐ EST TOTAL UNITS

| ATTRIBUTE NAME | VENDOR NAME | ROUND | UTILITY |
|---|---|---|---|
| FAC FACTORY CITY UNIT COST (US) | RIVER GOLF & BANQUET | 1 | $150 |
| | CHANCE GOLF | 1 | $100 |
| PORT OF EXPORT UNIT COST (US) | RIVER GOLF & BANQUET | 1 | $250 |
| | CHANCE GOLF | 1 | $150 |
| PREPAID DOMESTIC UNIT COST (US) | RIVER GOLF & BANQUET | 1 | $200 |
| COLLECT DOMESTIC UNIT COST (US) | RIVER GOLF & BANQUET | 1 | $300 |
| | CHANCE GOLF | 1 | |
| DVS COST (US) | RIVER GOLF & BANQUET | 1 | $400 |
| | CHANCE GOLF | 1 | $5 |
| SUGGESTED UNIT RETAIL | RIVER GOLF & BANQUET | 1 | |
| | CHANCE GOLF | 1 | $10 |

FIG. 20

≡ NEGOTIATION EVENTS > NEGOTIATION EVENTS > D81 CL 4&22 NATIONAL BRAND

| REVIEW & NEGOTIATE BIDS | FINANCIAL BASELINE | COMPARE BIDS | FINANCIAL ROLLUPS | FINAL ASSORTMENT |
|---|---|---|---|---|

ROLLUP

DEFAULT VIEW ▶ — 2210

⌁ FILTERS 2540/2540/6  ⟳ REFRESH GRID

SEE SUMMARY SUBTOTALS BY: DEFAULT GROUP ▶ — 2212

ALL — 2202

| GROUP 2214 | COUNT | TOTAL RETAIL | TOTAL PMU | TOTAL UNITS | AVERAGE RETAIL | AVG. NET COST |
|---|---|---|---|---|---|---|
| ⊞ TOTAL | 999 | $0 | 100.00% | 12,037,404 | $7.51 | $0 |

STORE UNIQUE — 2204

| GROUP | COUNT | TOTAL RETAIL | TOTAL PMU | TOTAL UNITS | AVERAGE RETAIL | AVG. NET COST |
|---|---|---|---|---|---|---|
| ⊞ TOTAL | 132 | $0 | 100.00% | 2,615,760 | $3.3 | $0 |

CROSSOVER — 2206

| GROUP | COUNT | TOTAL RETAIL | TOTAL PMU | TOTAL UNITS | AVERAGE RETAIL | AVG. NET COST |
|---|---|---|---|---|---|---|
| ⊞ TOTAL | 140 | $0 | 100.00% | 2,192,216 | $7.09 | $0 |

EXTENSION — 2208

| GROUP | COUNT | TOTAL RETAIL | TOTAL PMU | TOTAL UNITS | AVERAGE RETAIL | AVG. NET COST |
|---|---|---|---|---|---|---|
| ⊞ TOTAL | 1 | $0 | 100.00% | 0 | $0 | $0 |

FIG. 22

| GROUP 2214 | COUNT | TOTAL RETAIL | TOTAL PMU | TOTAL PMU | TOTAL UNITS | AVERAGE RETAIL | AVG. NET COST |
|---|---|---|---|---|---|---|---|
| ⊟TOTAL | 999 | $90,396,290.1 | 100.00% | | 12,037,404 | $7.51 | $0 |
| ⊟BUSINESS PARTNER | | | | | | | |
| VENDOR1 | 3 | $0 | 0.00% | 0 | 0 | $0 | $0 |
| VENDOR2 | 1 | $0 | 0.00% | 0 | 0 | $0 | $0 |
| VENDOR3 | 1 | $0 | 0.00% | 0 | 0 | $0 | $0 |
| VENDOR4 | 16 | $0 | 0.00% | 0 | 0 | $0 | $0 |
| VENDOR5 | 11 | $0 | 0.00% | 0 | 0 | $0 | $0 |
| VENDOR6 | 100 | $0 | 0.00% | 0 | 0 | $0 | $0 |
| VENDOR7 | 10 | $0 | 0.00% | 0 | 0 | $0 | $0 |
| VENDOR8 | 4 | $0 | 0.00% | 0 | 0 | $0 | $0 |
| VENDOR9 | 207 | $0 | 0.00% | 0 | 0 | $0 | $0 |
| VENDOR10 | 19 | $0 | 0.00% | 0 | 132,360 | $17.68 | $0 |
| VENDOR11 | 4 | $0 | 0.00% | 0 | 312,000 | $4.39 | $0 |
| VENDOR12 | 20 | $0 | 0.00% | 0 | 219,960 | $15.42 | $0 |
| VENDOR13 | 5 | $0 | 0.00% | 0 | 911,716 | $3.53 | $0 |
| VENDOR14 | 20 | $0 | 0.00% | 0 | 0 | $0 | $0 |

FIG. 23

≡ NEGOTIATION EVENTS > NEGOTIATION EVENTS > D81 CL 4&22 NATIONAL BRAND

DEFAULT VIEW ▶

⇌ FILTERS 2540/2540  ⟳ REFRESH GRID

SEE SUMMARY SUBTOTALS BY: DEPT ▶  CLASS ▶ ⊖ ← 2212

ALL

| GROUP | COUNT | TOTAL RETAIL | TOTAL PMU | TOTAL UNITS | AVERAGE RETAIL | AVG. NET COST |
|---|---|---|---|---|---|---|
| ⊟ TOTAL | 999 | $90,396,290.1 | 100.00% | 12,037,404 | $7.51 | $0 |
| ⊟ DEPT | | | | | | |
| ⊞ 81 | 998 | $90,396,290.1 | 100.00% | 12,037,404 | $7.51 | $0 |
| ⊞ 30 | 1 | $0 | 0.00% | 0 | $0 | $0 |

STORE UNIQUE

| GROUP | COUNT | TOTAL RETAIL | TOTAL PMU | TOTAL UNITS | AVERAGE RETAIL | AVG. NET COST |
|---|---|---|---|---|---|---|
| ⊞ TOTAL | 132 | $8,628,962.4 | 100.00% | 2,615,760 | $3.3 | $0 |

CROSSOVER

| GROUP | COUNT | TOTAL RETAIL | TOTAL PMU | TOTAL UNITS | AVERAGE RETAIL | AVG. NET COST |
|---|---|---|---|---|---|---|
| ⊞ TOTAL | 140 | $15,551,152.84 | 100.00% | 2,192,216 | $7.09 | $0 |

EXTENSION

| GROUP | COUNT | TOTAL RETAIL | TOTAL PMU | TOTAL UNITS | AVERAGE RETAIL | AVG. NET COST |
|---|---|---|---|---|---|---|
| ⊞ TOTAL | 1 | $0 | 0.00% | 0 | $0 | $0 |

FIG. 24

≡ NEGOTIATION EVENTS > NEGOTIATION EVENTS > D81 CL 4&22 NATIONAL BRAND ~2202

🔒 LOCK ASSORTMENT SELECTIONS   🔒 EDIT ASSORTMENT SELECTION

≡ FILTERS 999/999   2504

| PCN ITEM ID | DESCRIPTION | DPCI | VENDOR1 | VENDOR2 |
|---|---|---|---|---|
| | | | ☑ SELECT ALL PRODUCTS | ☑ SELECT ALL PRODUCTS |
| 45890 | POMS-GLITTER 1"-40CT | 081-04-1243 | | ☑ SELECT PRODUCT |
| 45898 | CHENILLE STEMS-6" 100CT ASSORTED | 081-04-1224 | | |
| 45927 | CRAFT PACK-131CT | 081-04-1371 | | ☑ SELECT PRODUCT |
| 46024 | SPIRAL SKETCH PAPER PAD-100CT | 081-22-2852 | | ☑ SELECT PRODUCT |
| 46032 | 9X12 CONSTRUCTION PAPER-200CT HEAVY | 081-22-0720 | | ☑ SELECT PRODUCT |
| 46081 | WATERCOLOR PAPER PAD-20CT | 081-22-2853 | | ☑ SELECT PRODUCT |
| 46128 | CRAFT STICKS 150CT-NATURAL | 081-04-4454 | | ☑ SELECT PRODUCT |
| 46155 | SPIRAL DRAWING PAPER PAD-60CT | 081-22-2851 | | ☑ SELECT PRODUCT |
| 46240 | PAINT SPONGES-DINOSAUR 9CT | 081-04-1294 | | ☑ SELECT PRODUCT |
| 47618 | SQUISHY FOAM | | | ☑ SELECT PRODUCT |
| 46059 | DCWV PAPER | 081-22-3200 | ☑ SELECT PRODUCT | |
| 46109 | DCWV | 081-22-3201 | ☑ SELECT PRODUCT | |

≡ NEGOTIATION EVENTS>VIEW PRODUCTS-STATIONARY COMPANY

REVIEW PRODUCTS    ADD PRODUCT    ADD ATTRIBUTES    ADD CUSTOM ATTRIBUTES

← BACK

DEFAULT VIEW ▼

≡ FILTERS 6/6  ✎ BULK UPDATE  ↶ UNDO  ↷ REDO

2701

| SELECT | BUYERS CHOICE | EXPOSE TO BP | PRODUCT DESC. | DEPT | CLASS | CF/NEW | FACTORY NAME/FACTORY ID |
|---|---|---|---|---|---|---|---|
| ☐ | | ☒ | RING BINDER 1IN-RED | 81 | 3 | NEW | VENDOR1/16900856 |
| ☐ | | ☒ | RING BINDER 1.5IN-RED | 81 | 3 | NEW | VENDOR1/16900856 |
| ☐ | | ☒ | RING BINDER 1IN-ORANGE | 81 | 3 | NEW | VENDOR1/16900856 |
| ☐ | | ☒ | RING BINDER 2IN-ORANGE | 81 | 3 | NEW | VENDOR1/16900856 |
| ☐ | | ☒ | RING BINDER 2IN-RED | 81 | 3 | NEW | VENDOR1/16900856 |
| ☐ | | ☒ | RING BINDER 1.5IN-ORANGE | 81 | 3 | NEW | VENDOR1/16900856 |
| ☐ | | ☒ | RING BINDER 1IN-YELLOW | 81 | 3 | NEW | VENDOR1/16900856 |
| ☐ | | ☒ | RING BINDER 1.5IN-YELLOW | 81 | 3 | NEW | VENDOR1/16900856 |
| ☐ | | ☒ | RING BINDER 2IN-YELLOW | 81 | 3 | NEW | VENDOR1/16900856 |

↳ DRILL  ▢ COPY 2702   2704

ITEM DATABASE CREATION BASED ON NEGOTIATED VALUES

BACKGROUND

Many retailers typically negotiate with vendors before agreeing to offer a product for sale in the retail enterprise. In some negotiations, multiple different attribute values of the product are negotiated including things such as where the product will be manufactured, what port the product will be shipping from, the number of items in the product, the dimensions of the product, the colors of the product, what the product will be made from, the cost associated with shipping the product, the per item cost of the product and so forth.

The discussion above is merely provided for general background information and is not intended to be used as an aid in determining the scope of the claimed subject matter. The claimed subject matter is not limited to implementations that solve any or all disadvantages noted in the background.

SUMMARY

A computer-implemented method includes receiving a plurality of attribute headings for a product and storing the product and the associated attribute headings as part of a negotiation. A request for products associated with the negotiation is received and in response, a user interface listing at least one of the attribute headings for the product and providing controls for entering an attribute value for the listed at least one attribute heading is generated and transmitted. An attribute value for the listed attribute heading is received as part of a bid during the negotiation and is stored. An indication that the negotiation is complete is received and in response, the attribute value for the listed attribute heading is locked. An instruction to create a new item in an item database is received and in response to the received instruction, a request is sent to retrieve the locked attribute value and store the locked attribute value in an item database used by retail systems to acquire information about products for sale in a retail enterprise.

In a further embodiment, a method includes receiving an indication that a negotiation for the production of a retail item has concluded and locking stored attribute values for the retail item that were negotiated during the negotiation. The stored attribute values are transferred to an item database that is used by a retail enterprise to provide information about retail items that are sold by the retail enterprise, wherein the item database was actively being used by the retail enterprise while the negotiation was taking place.

In a still further embodiment, a negotiation system includes an item database server and a negotiation server. The item database server receives requests for attribute values for attributes of products for sale by a retail enterprise and in response to the requests, retrieves stored attribute values from an item database and provides the retrieved attribute values. The negotiation server provides user interfaces to facilitate multiple rounds of bidding during which attribute values for an attribute of a product are negotiated. The negotiation server receives an indication that negotiations are complete and in response, locks current attribute values negotiated during the negotiation so that the locked current attribute values can be sent to the item database server for storage in the item database.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 3 is an example user interface for copying an existing negotiation event to form a new negotiation event.

FIG. 5 is an example user interface for indicating that a new product is to be added to the negotiation.

FIG. 9 is an example user interface for adding an existing product to a negotiation.

FIG. 11 is an example user interface for altering attribute values of an existing product added to a negotiation.

FIG. 13 is an example user interface allowing a vendor to enter attribute values for products as part of the vendor's bid.

FIG. 15 is an example user interface allowing a user to select attribute headings and products to appear in change history user interface.

FIG. 19 is an example user interface for selecting attributes for the vendor comparison user interface.

FIG. 20 is an example user interface showing a vendor comparison.

FIG. 22 is an example user interface for displaying rollups of various financial metrics.

FIG. 23 is an example user interface for displaying subtotals of rollups of various financial metrics.

FIG. 24 is an example user interface for displaying different groupings of rollups of various financial metrics.

FIG. 25 is an example of a user interface for making a final selection of vendors for a negotiation to indicate that the negotiation is complete.

FIG. 27 is an example user interface for creating child products from a product that is part of a negotiation.

DETAILED DESCRIPTION

After a negotiation for a product has concluded, many of the agreed to parameters or attributes of the product need to be placed in an item database that the retail enterprise uses to track inventory and to provide descriptions of the products to employees and consumers. For example, the number of items per package, the colors of the items, the weight of the items, how the items will be shipped, how many items will be provided per shipping container and the cost associated with the item must all be stored in the item database. In the past, this information has been stored in the item database by hand because negotiations have been performed on an ad hoc basis with different negotiators using different tools to identify the attributes of the products. However, entering such information manually is error prone and can result in significant and costly mistakes in the item database resulting in poor inventory control for the retail enterprise.

In the embodiments described herein, a system is provided in which a negotiation server coordinates rounds of bidding during a negotiation and stores attribute values that are received for each round of bidding. When the negotiation is finalized, the negotiation server locks the final sets of attribute values for the products so they cannot be altered. An instruction to set up an item in the item database based on the negotiated attributes of the product is then received. Based on the instruction, the locked negotiated attribute values are automatically uploaded to the item database such that the item database is guaranteed to accurately reflect the negotiated attributes for the products. In addition, the negotiation server provides various tools that are helpful during the negotiation including the ability to compare bids from competing vendors while keeping the bids secret from the competing vendors, allowing negotiation participants to see a history of attribute values during the current negotiation and in some embodiments to see a history of the attribute values across multiple past negotiations. In addition, some embodiments allow a purchaser to define a custom attribute that is not present in the item database but that can used simply for negotiation purposes while also allowing the purchaser to select from a plurality of previously defined attributes that are present in the item database when selecting attributes for the negotiation. Further embodiments allow the purchaser to use a product identifier to retrieve the attribute headings and attribute values of a current product from the item database when creating the attribute headings that will be negotiated during a new negotiation for the same product or for a new product that will be based on a previous product. Still further embodiments allow for multi-tier negotiations where negotiations can take place at different levels of product groupings.

Figure 1:
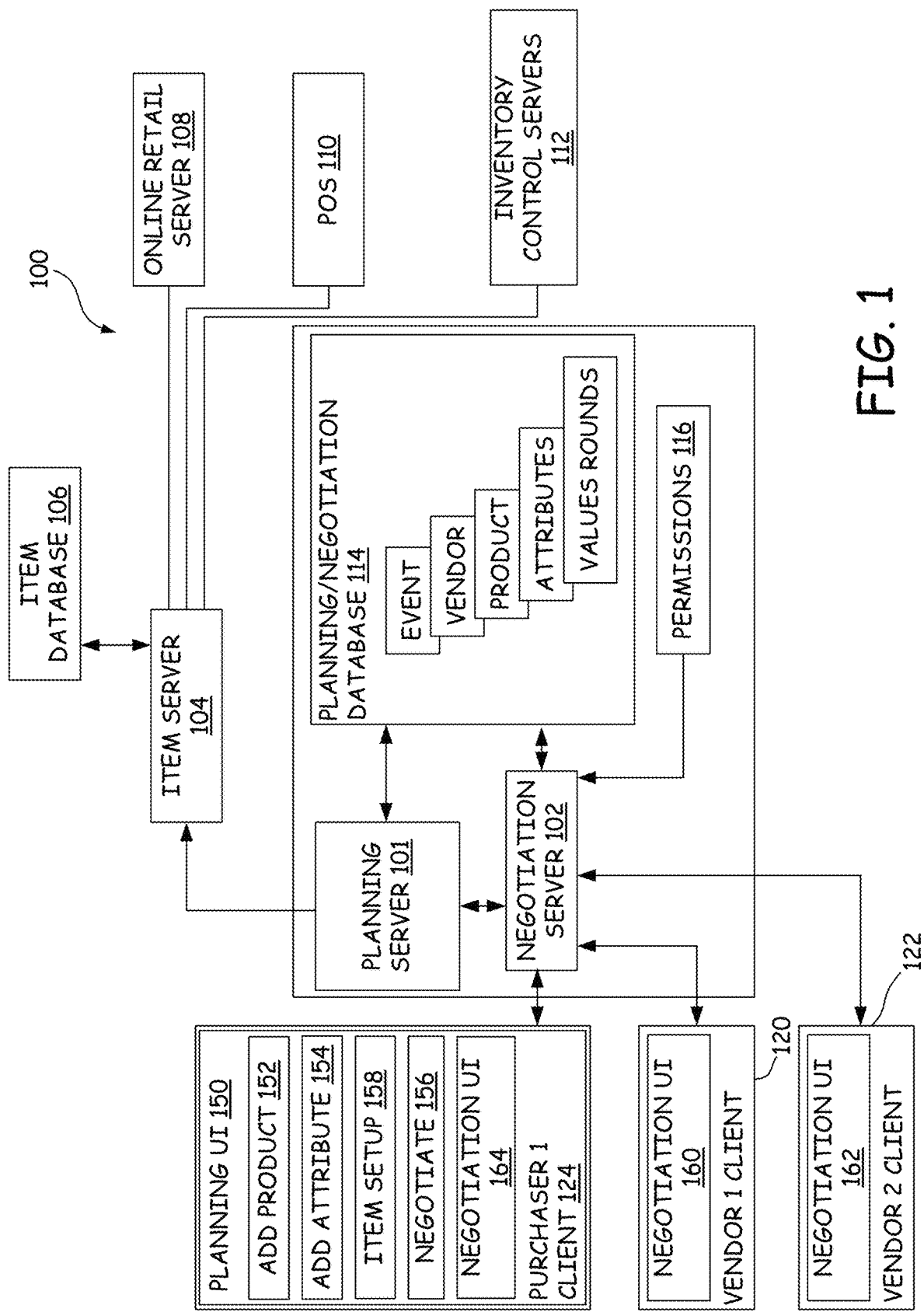
FIG. 1 is block diagram of a negotiation system in accordance with one embodiment.

FIG. 1 provides a block diagram of a negotiation system 100 that includes a planning server 101, a negotiation server 102 and an item server 104. Item server 104 allows information to be stored to and retrieved from an item database 106 that contains a collection of attribute values for each of a set of products sold by a retailer enterprise and can be implemented with one or more server machines. The information in item database 106 may be accessed by various retail systems including online retail servers 108, point-of-service terminals 110 and inventory control servers 112, for example. Item database 106 is in use by the retail enterprise while negotiations are taking place.

Planning server 101 provides planning user interfaces 150 to one or more purchaser clients, such as Purchaser 1 Client 124. Planning user interfaces 150 include controls for planning future products to be sold by the retailer. Examples of the controls include and Add Product control 152 for adding a new potential product to a list of potential products that the retailer might sell, Add Attribute control 154 for adding attributes to a potential product, Negotiate control 156 for defining and starting a negotiation with one or more vendors to provide potential products to the retailer, and an Item Setup control 158 for automatically transferring negotiated attribute values for a potential product from a planning/negotiation database 114 to item database 106 so that the attribute values are not corrupted and so that the potential product becomes an actual product for sale.

Negotiation server 102 provides user interfaces to collect information relative to a negotiation between a purchaser and one or more vendors and backend processes that store the collected information in a negotiation database 114. In the description below, each negotiation is referred to as an event and each event can have one or more vendors involved in the negotiation and the negotiation can cover one or more products with different vendors bidding on different combinations of products within the same negotiation or all vendors bidding on the same products. Each negotiation can involve multiple rounds of bidding.

Negotiation server 102 uses a set of permissions 116 to control which data from negotiation database 114 is provided to each user. Such permissions prevent one vendor from seeing the negotiation data provided by another vendor unless the purchaser allows the vendors to see each other's information. Negotiation server 102 provides negotiation user interfaces to one or more vendor clients, such as negotiation user interface 160 to vendor 1 client 120 and negotiation user interface 162 to vendor 2 client 122 and to one or more purchaser clients, such as negotiation user interface 164 to purchaser 1 client 124.

Figure 2:
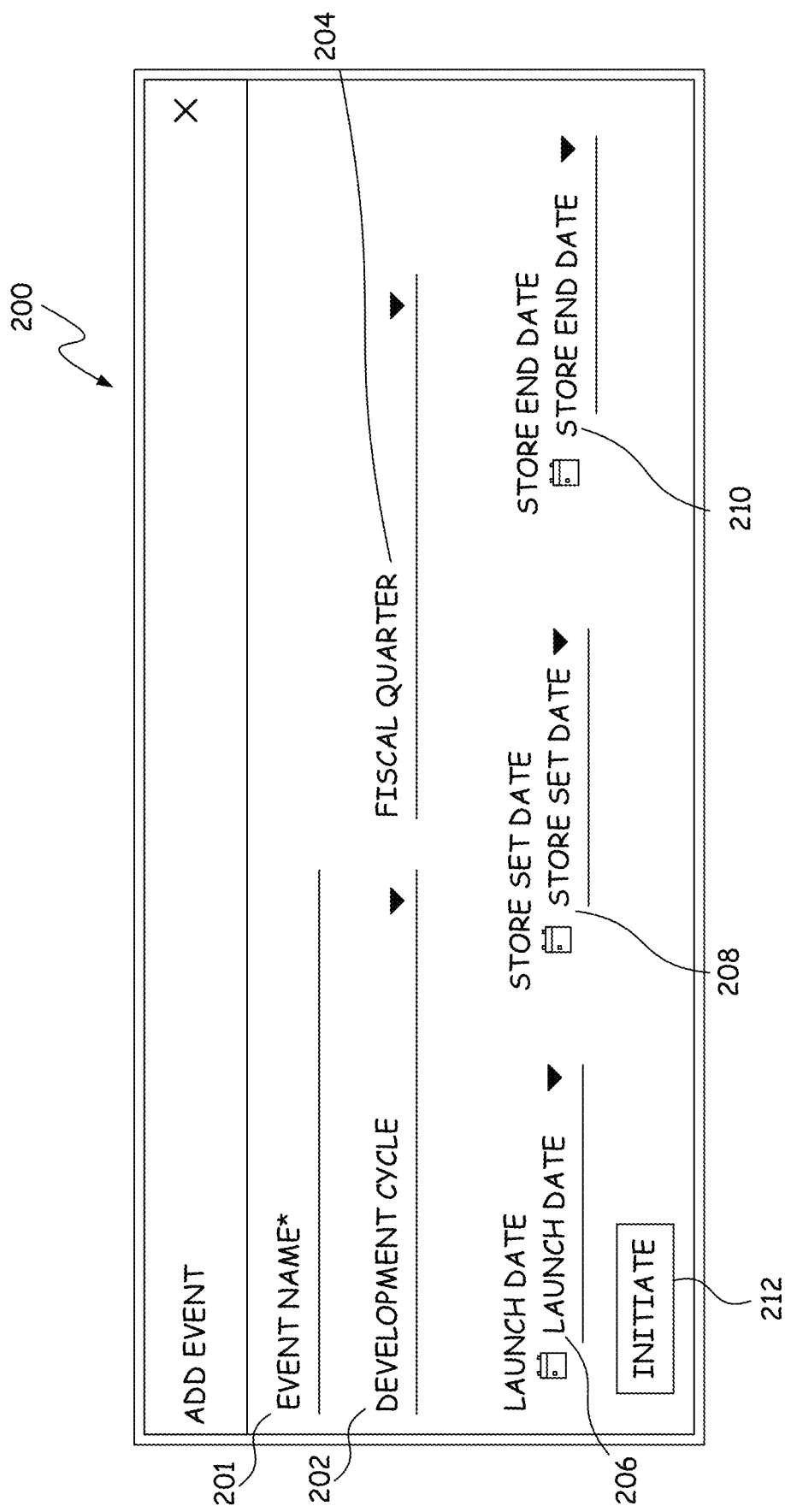
FIG. 2 is an example user interface for adding a negotiation event to form a new negotiation event.

In accordance with one embodiment, a negotiation begins by a purchaser using a user interface 164 provided by negotiation server 102 to define a new event/negotiation. To define an event, the purchaser provides a name for the event and identifies at least one vendor who will take part in the negotiation. The information concerning the vendor is present in a separate vendor database (not shown) that is populated during a vendor setup or vendor "onboarding" process. In other embodiments, a new event (negotiation) can be created using user interface 200 of FIG. 2. In user interface 200, a purchaser enters data in an Event Name field 201, a Development Cycle field 202, a Fiscal Quarter field 204, a Launch Date field 206, a Store Set Date field 208 and a Store End Date field 210. Event Name field 201 receives a name for the negotiation, Development Cycle field 202 receives a development cycle during which the negotiation is to take place, Fiscal Quarter 204 receives the Fiscal Quarter during which the negotiation is to take place, Launch Date field 206 receives the date a product is to be available either online or in stores, Store Set Date 208 receives the date that the product is to appear on store shelves, and Store End Date 210 receives the date that the product will no longer appear on store shelves. An Initiate button 212 creates the new event when selected.

Alternatively, a new event can be created by copying an existing event. Specifically, when viewing a list of existing events, the user may select a control to copy the event resulting in user interface 300 of FIG. 3. In FIG. 3, the name for the new event is entered into field 302 and the user presses the submit button 304 to create a copy of a previously selected event. The copied event will have the same vendors and the same products and attributes for those products as the previously used event. This allows users to create a new negotiation event quickly for negotiations that are performed on a regular basis.

Figure 4:
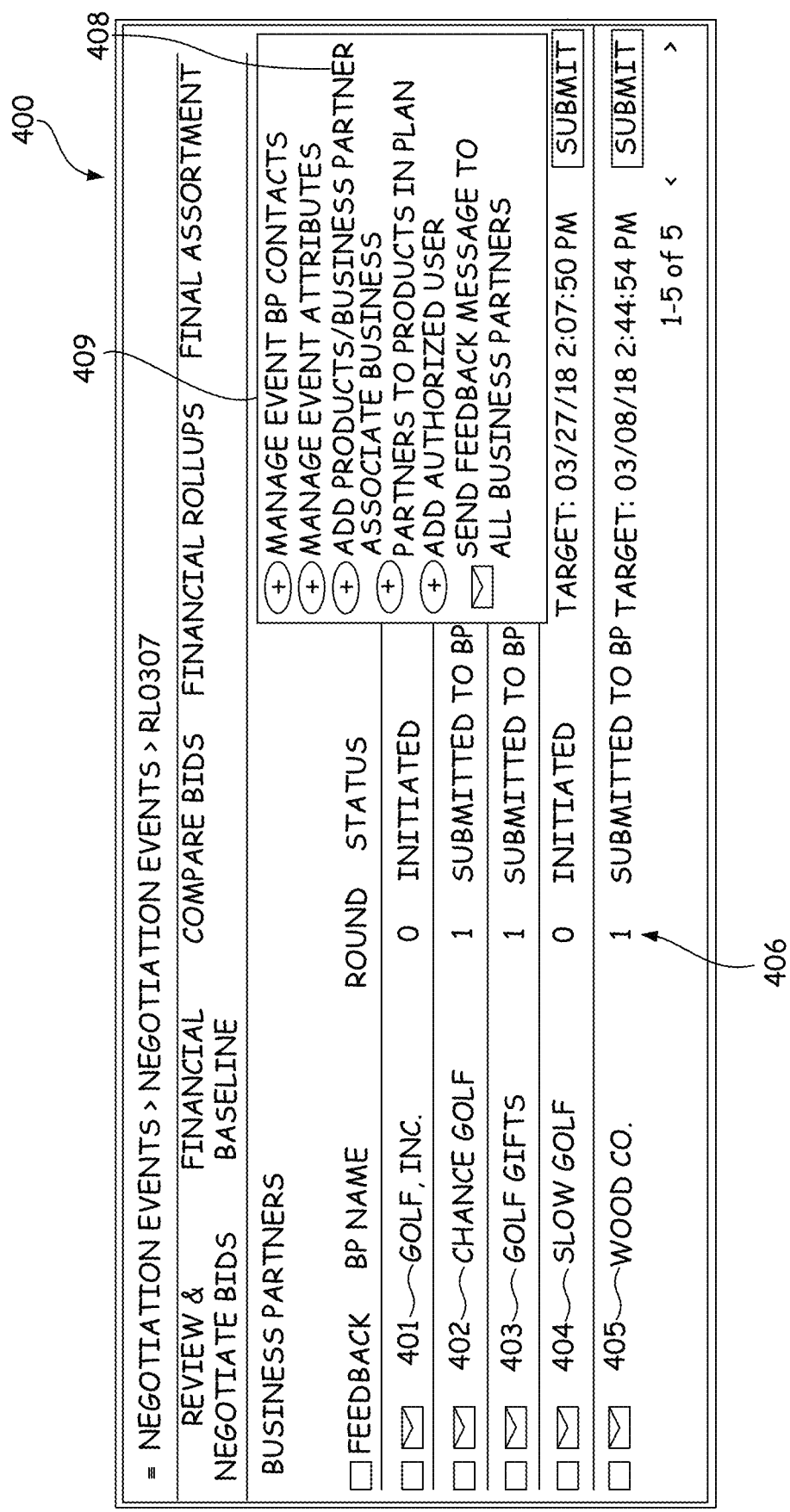
FIG. 4 is an example user interface showing business partners/vendors assigned to a negotiation and controls for adding products and additional vendors to the negotiation.

In accordance with one embodiment, negotiation server 102 allows a purchaser to view the vendors that have been assigned to the negotiation and to add products and additional business partners/vendors to a negotiation using user interface 400 of FIG. 4. In user interface 400, five vendors 401, 402, 403, 404, and 405 are shown as being assigned to the current negotiation and the current round of negotiation for each vendor is shown in column 406. The purchaser can add products or additional vendors by selecting a control 408 in a menu 409. The selection of control 408 when received by negotiation server 102 causes negotiation server 102 to send user interface 500 of FIG. 5. User interface 500 allows a user to add a product to the negotiation with one or more vendors. The purchaser can add products to the negotiation with all of the vendors associated with the negotiation or with particular vendors of the negotiation using checkboxes 502. The product added to the negotiation can be an existing product or can be a new product that has never been sold in the retail enterprise. To add a new item, button 504 is selected and the department and class for the new item are entered in fields 506 and 508. Multiple new items may be added to the negotiation by setting the number of items to add in field 510. When the information for the added product(s) has been entered, the user selects Add Product button 512, which is then received by negotiation server 102 as an instruction to add one or more products to the list of products associated with the selected vendors for the current negotiation.

Figure 6:
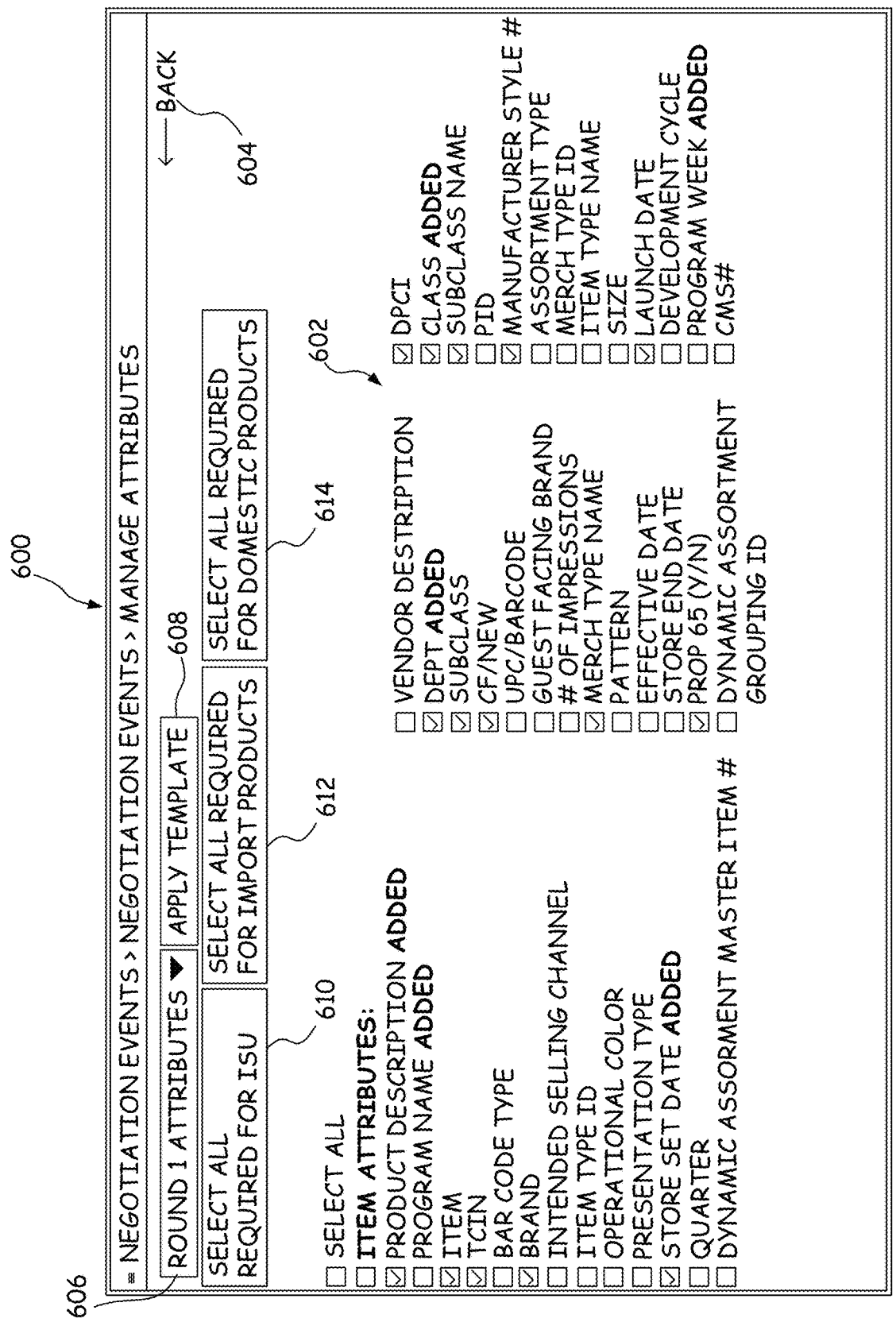
FIG. 6 is an example user interface showing a selectable list of attributes that can be added to a product for a negotiation.

Upon the selection of button 512, negotiation server 102 returns an add attribute window 600 as shown in FIG. 6. Add attribute window 600 includes a list 602 of attribute headings that can be associated with the product with each attribute heading having a respective selection checkbox. In accordance with one embodiment, the attributes listed in window 600 are taken from item database 106 and include all possible attributes for items in the department and class selected in user interface 500. The user may select one or more of the attributes, which will form the basis of the negotiation on the product by selecting checkboxes next to the attribute headings. Alternatively, the user can select an attribute template from pull-down menu 606 and activate Apply Template control 608. This causes the attributes listed in the chosen template to be selected. New templates can be defined through various user interfaces that allow the template to be named and allow attributes to be selected for the template. The attributes assigned to a template may also be changed through user interfaces that allow selected attributes to be deselected and attributes that were not previously selected to be selected.

The user may also select one of controls 610, 612 and 614 to automatically select a set of attributes. Selection of control 610 causes all attributes required to setup a new item in item database 106 to be selected. Selection of controls 612 and 614 causes attributes to be selected that are required for imported products and for domestic products, respectively. Upon selection of back button 604, the selected attributes are returned to negotiation server 102, which then stores the attributes with the products for the selected vendors in planning/negotiation database 114.

In accordance with one embodiment, an initial set of attributes is selected for negotiation. When the negotiation is complete, a user returns to user interface 500 and selects control 610 to add all additional attributes that are required to setup a new item in item database 106. Thus, any attributes that had not previously been selected that are required for item setup are automatically added through the selection of control 610. Note that the selection of control 610 does not remove any existing attributes previously selected for the product. Thus, all of the attributes and their negotiated values remain and the missing attributes required for item setup are added. The user then enters values for each of the attributes that were added by the selection of control 610.

Figure 7:
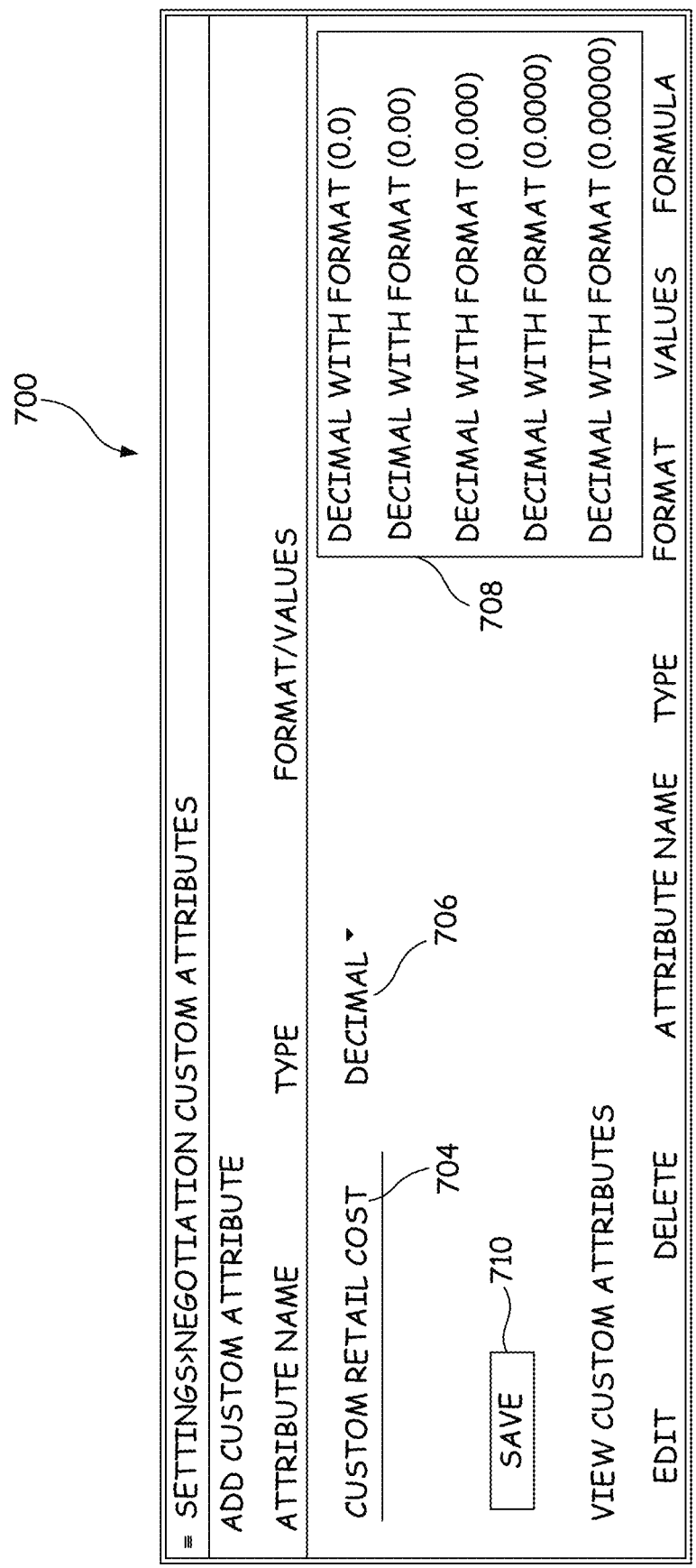
FIG. 7 is an example user interface for defining a custom attribute to add to a negotiation.
Figure 8:
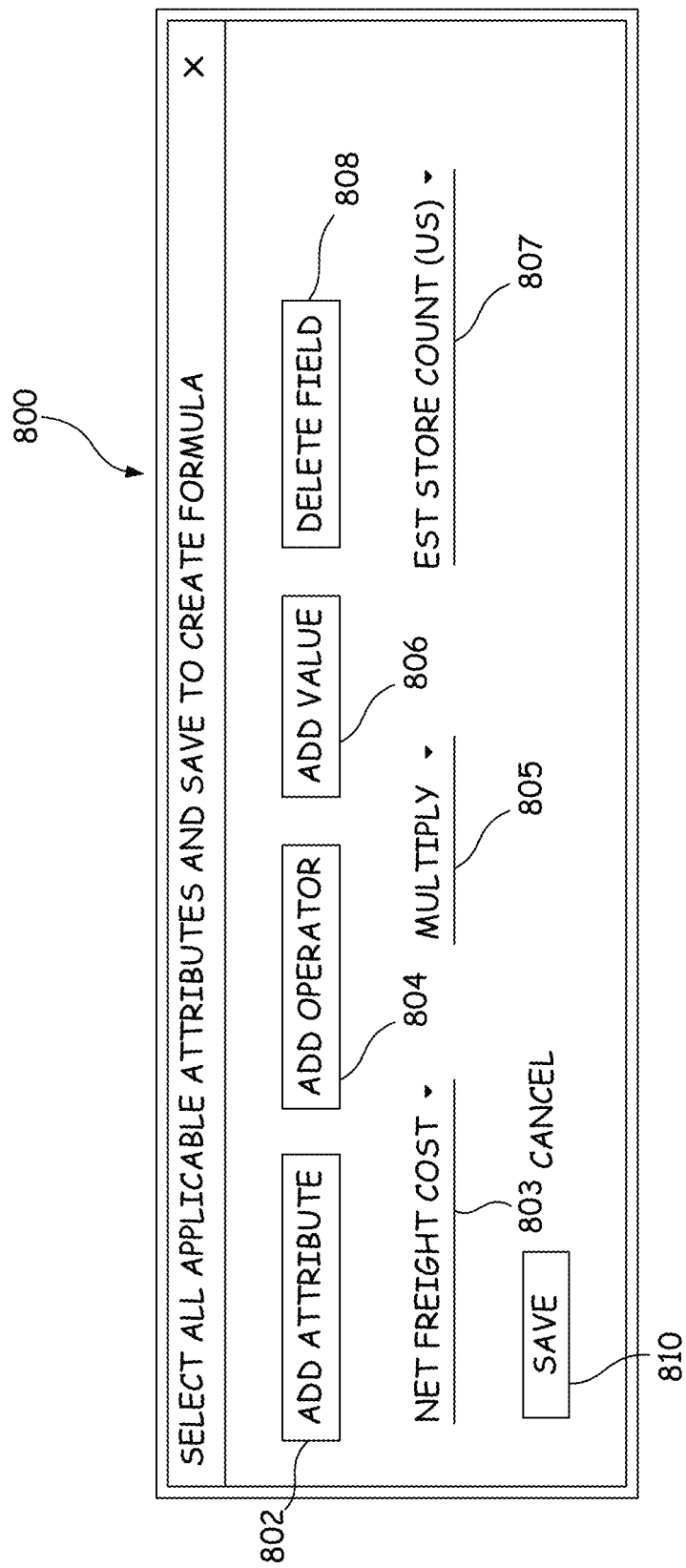
FIG. 8 is an example user interface for defining a custom calculated attribute to add to a negotiation.

In addition, the purchaser may define custom attributes for a product using a custom attributes user interface 700 of FIG. 7. In custom attributes user interface 700, the purchaser can set an attribute name 704, an attribute type 706, and an attribute format or acceptable values 708. Once the user has provided the values for these parameters of the custom attribute, the new attribute can be saved by selecting Save button 710.

The purchaser may also define custom calculated attributes using user interface 800. Each custom calculated attribute is a formula for calculating a value where each formula is constructed of a combination of attribute values, operators and designated values. The purchaser creates the formula using Add Attribute button 802 to add attributes to the formula such as attributes 803 and 807, Add Operator button 804 to add an operator to the formula such as operator 805, and Add Value button 806 to add designated values. The attributes and operators can be changed using a pull-down control on the attribute/operator. The designated values can be changed by entering a new value in the designated value field. Any of the attributes, operators, or designated values can be deleted by selecting the appropriate field and then pressing Delete Field button 808. When the formula is complete, the purchaser selects Save button 810 to save the custom attribute.

A product may also be added to a vendor's list of products for bidding by using an identifier for an existing product, such as the MIC identifier or the DPCI identifier. In FIG. 9, a user interface 900 is provided in which a user has selected DPCI button 902 and has entered a department 904, a class 906 and an item number 908 that together represent the DPCI for an existing product in item database 106. In addition, the purchaser has designated which vendors are to bid on the new product using check boxes 912, 914 and 916. When check box 912 is selected, all of the vendors are selected. Upon selection of ADD PRODUCT button 910, the attributes for the identified product are retrieved from item database 106 by negotiation server 102 through item server 104 and are stored in negotiation database 114 for the vendors selected using checkboxes 912, 914 and 916. In accordance with one embodiment, all of the attribute headings associated with a product are placed in negotiation database 114 along with the current values for the identified product.

Figure 10:
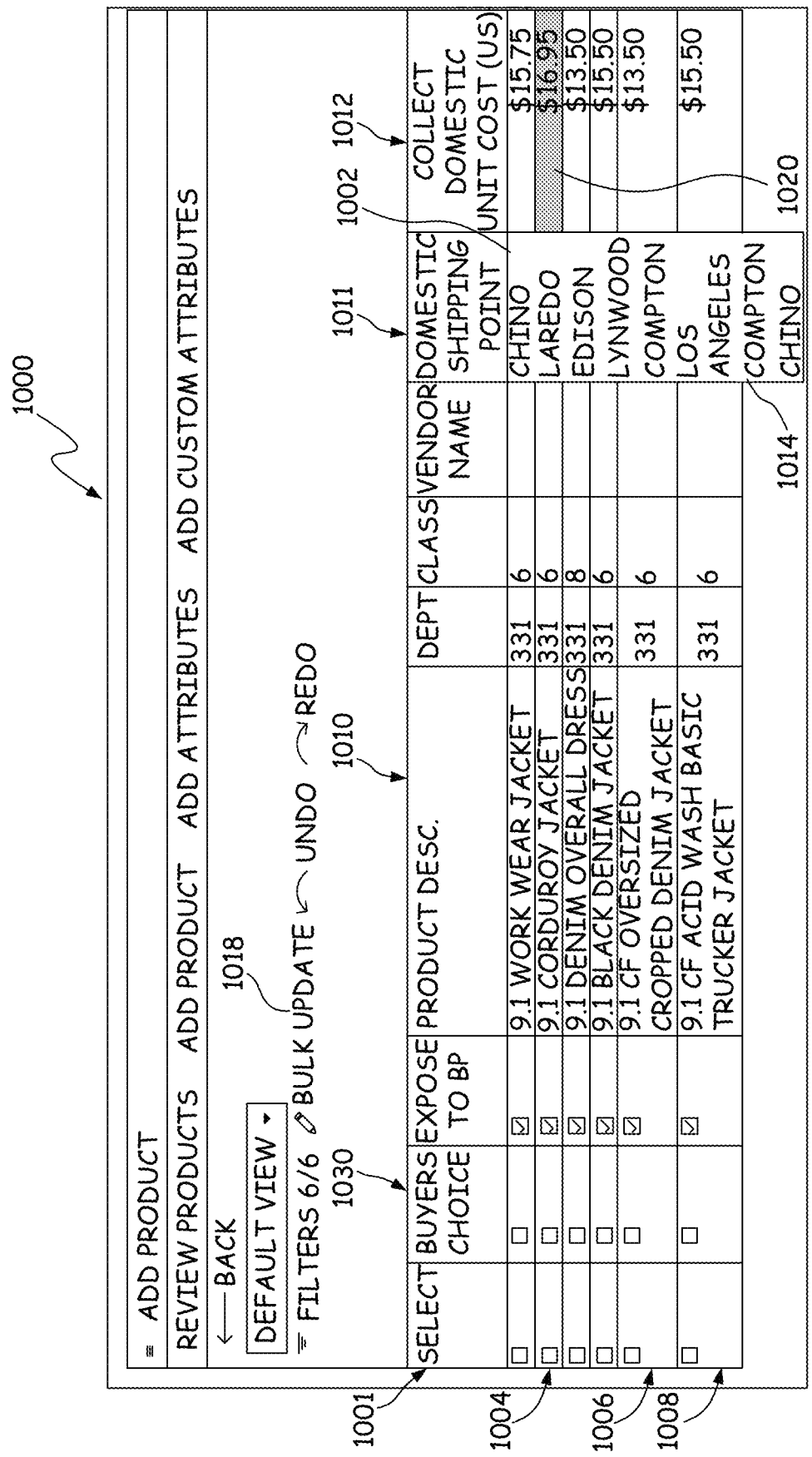
FIG. 10 is an example user interface for entering/editing attribute values for products assigned to a negotiation.

After a product has been added to one or more vendors, a user may select a vendor to view all of the products that have been assigned by the purchaser to the vendor for bidding. An example of such a user interface 1000 is shown in FIG. 10 and shows six separate products that have been assigned to a particular vendor in a list of products 1001. In list 1001, each product is shown in a separate row such as rows 1004, 1006 and 1008, and the attribute headings selected for the products are shown in separate columns such as columns 1010, 1011 and 1012, for example. By clicking in the appropriate boxes, such as box 1002, a pulldown menu 1014 of possible values for the attribute heading is displayed where the possible values are determined from a list of allowed values defined for the attribute heading and/or a set of validation rules defined for the attribute heading. In addition to the pulldown menu of possible values, the user may also enter a value manually. Before generating a round of bids, the purchaser can fill in values for a number of the attribute headings. To fill in the same value for every product assigned to a vendor, the purchaser selects an attribute heading and then selects Bulk Update control 1018. A menu such as pulldown menu 1014 is then displayed to allow the purchaser to select a value or enter a value for the attribute heading. After the user makes their selection, the selected value is inserted into each product row within the attribute heading column.

User interface 1000 includes shaded cells such as shaded cell 1020 in column 1012. A shaded cell indicates a value that was changed in the latest round of bidding by the vendor. An unshaded cell indicates that the value has not been changed in the latest round of bidding from the vendor. Thus, the shading allows the purchaser to quickly see what values the vendor has changed in this round of the negotiation.

Column 1030 of user interface 1000 provides a Buyer's Choice attribute for the product. By selecting the check-box in Buyer's Choice column 1030, the purchaser indicates that if the negotiations ended today they would purchase this product from this vendor.

User interface 1100 of FIG. 11 shows a list of products 1101 assigned to a particular vendor where one of the products was added by entering a DPCI number in user interface 900. In particular, row 1008 contains the attribute values for the product and includes a designation of "carry forward" 1106 to indicate that the product is a current product in the item database. Once the information for the existing product has been added, the purchaser can change the DPCI number to another number or a blank value and may change any other attribute values. The purchaser may also remove attribute headings associated with the existing product. These changes do not affect the attribute heading or attribute values of the product in item database 106. Thus, the purchaser is able to use an existing product's attribute headings and attribute values as a starting point for generating the negotiating event but then may modify the product's entry in any way they desire.

Figure 12:
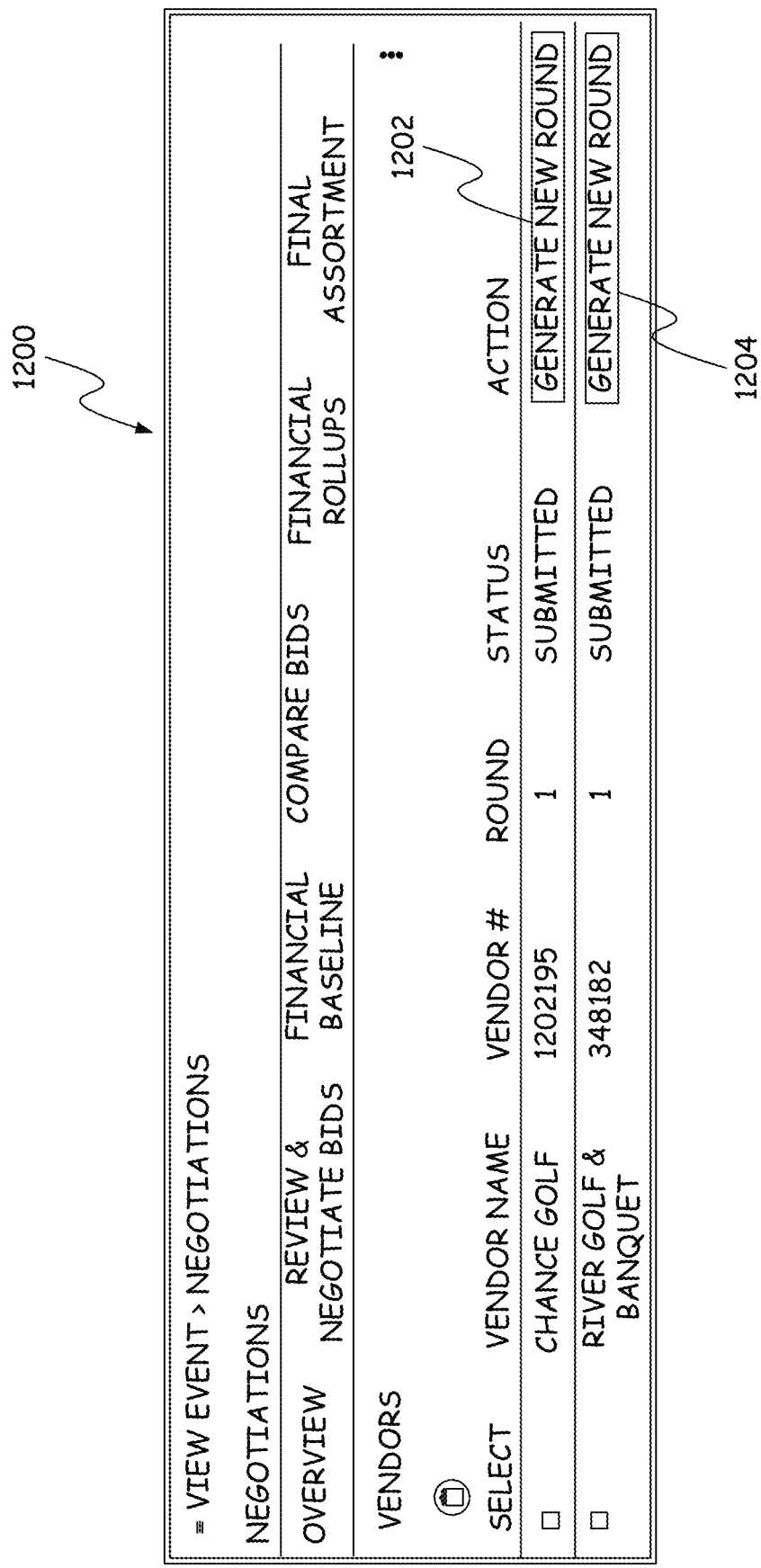
FIG. 12 is an example user interface showing controls for generating a next round of bidding during the negotiations.

Once the purchaser has entered the products, attribute headings and attribute values for those products that the purchaser wishes a vendor to bid upon, the purchaser can generate a new round of bidding using user interface 1200 of FIG. 12 and selecting control 1202 or control 1204. In user interface 1200, there is a separate control for generating a new round of bidding for each vendor in the negotiation. As a result, bid requests can be sent out to different vendors at different times within the same negotiation. Upon receiving the selection of control 1202 or control 1204, negotiation server 102 stores a notification for the corresponding vendor that will be displayed to the vendor the next time they login to negotiation server 102. Alternatively or additionally, negotiation server 102 sends an email or other notification to the vendor to indicate that a new round of bidding has been generated.

After a new round of bidding has been generated, the vendor uses one of the vendor clients 120 or 122 to set one or more attribute values for one or more products listed for the negotiation. Initially, the vendor logs into negotiation server 102 and then requests products associated with a particular negotiation. In response, negotiation server 102 sends a user interface to the vendor's client device that includes attribute headings for attributes that require attribute values and controls for entering attribute values for the products.

FIG. 13 provides a user interface 1300 that allows a vendor to enter attribute values. In the example user interface of FIG. 13, three products have been placed in the negotiation, each having a separate row 1302, 1304 and 1306 in table 1308 of user interface 1300. When the vendor is satisfied with the attribute values they have inserted, they can submit their bid using a submit control shown on a further user interface screen (not shown).

Figure 14:
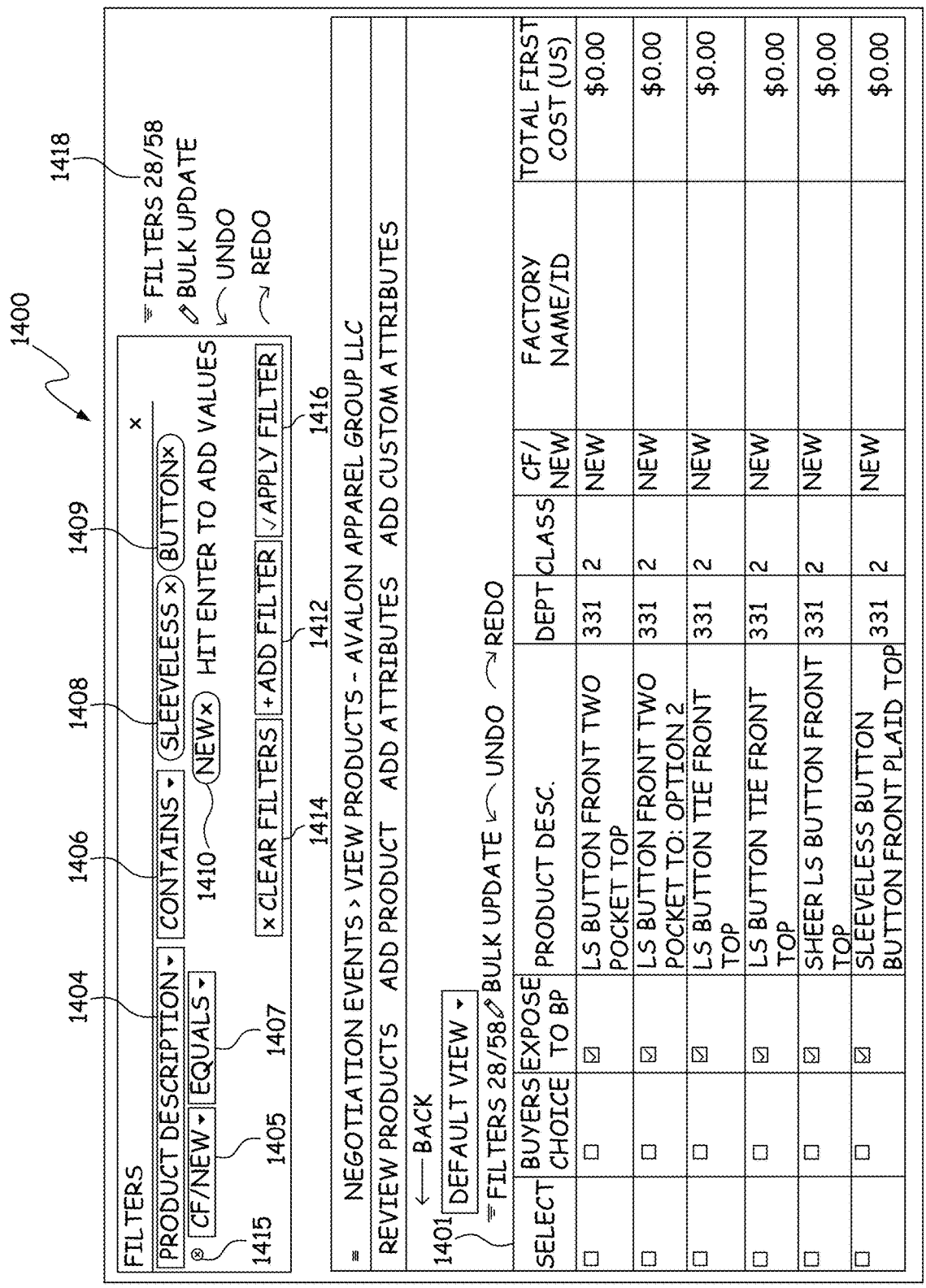
FIG. 14 is an example user interface allowing a user to designate a filter to select products to display.

In accordance with one embodiment, it is possible to filter products that are displayed in the user interfaces for a negotiation based on particular values for particular attribute headings. For example, FIG. 14 provides a user interface 1400 that allows the user to select one or more attribute headings such as attribute headings 1404 and 1405. For each attribute heading, a comparison operator, such as comparison operators 1406 and 1407 is selected, and one or more values, such as values 1408, 1409 for attribute heading 1404 and value 1410 for attribute heading 1405, are selected. Each selected attribute heading represents a separate filter. To add a new filter, Add Filter control 1412 is selected causing a window to open that allows an attribute heading to be selected. Once the attribute heading is selected, a comparison operator that can function with the attribute heading is selected. For attribute headings with a restricted set of possible values, a menu of the available values is displayed to allow the user to select which values are to be tested using the operator. For attribute headings that can take on any value, such as costs, a field is provided that allows the user to manually enter a value. The user can clear a filter using Clear Filter control 1414. When selected, Clear Filter control 1414 allows the user to select one or more filters to stop using. When a filter has been cleared, it appears with an X next to it such as X 1415. To reapply a filter that has been cleared, the user selects Apply Filter control 1416 and then selects a previously cleared filter.

With each change in the filters, a product list 1401 of products that satisfy the filter settings is update. The attribute values of the products displayed in product list 1401 can be manipulated in the same way as the attribute values of the products shown in product list 1001 of FIG. 10 including the ability to perform bulk updates. Filter control 1418 indicates the effectiveness of the currently applied filters by showing a ratio of the number of products displayed over the total number of products assigned to the event.

Figure 15:
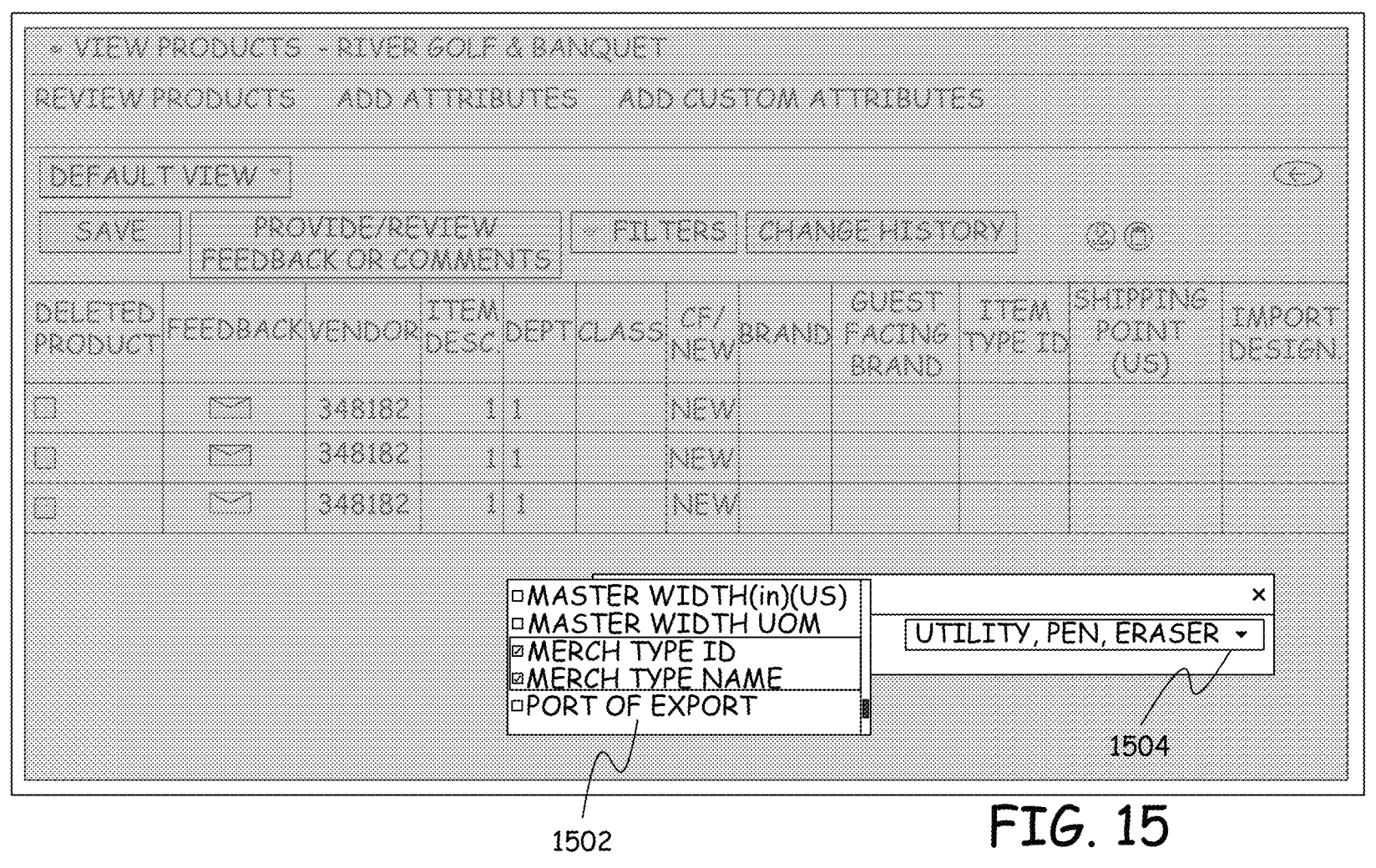

In accordance with some embodiments, negotiation server 102 provides user interfaces that allow users to request a history of values that have been submitted by either the vendor or the purchaser for selected attribute headings. FIG. 15 provides an example of a user interface 1500 that includes a pulldown menu 1502 having checkboxes for each attribute heading for the products assigned to the negotiation. The user may select one or more of these attribute headings to request a history of all attribute values that have been set for those headings. In addition, user interface 1500 includes a pulldown menu 1504 that allows the user to select one or more of the products that have been assigned to the negotiation. Thus, the user can request the history of attribute values for selected attribute headings for a single product, a plurality of products, or all of the products in the negotiation.

Figure 16:
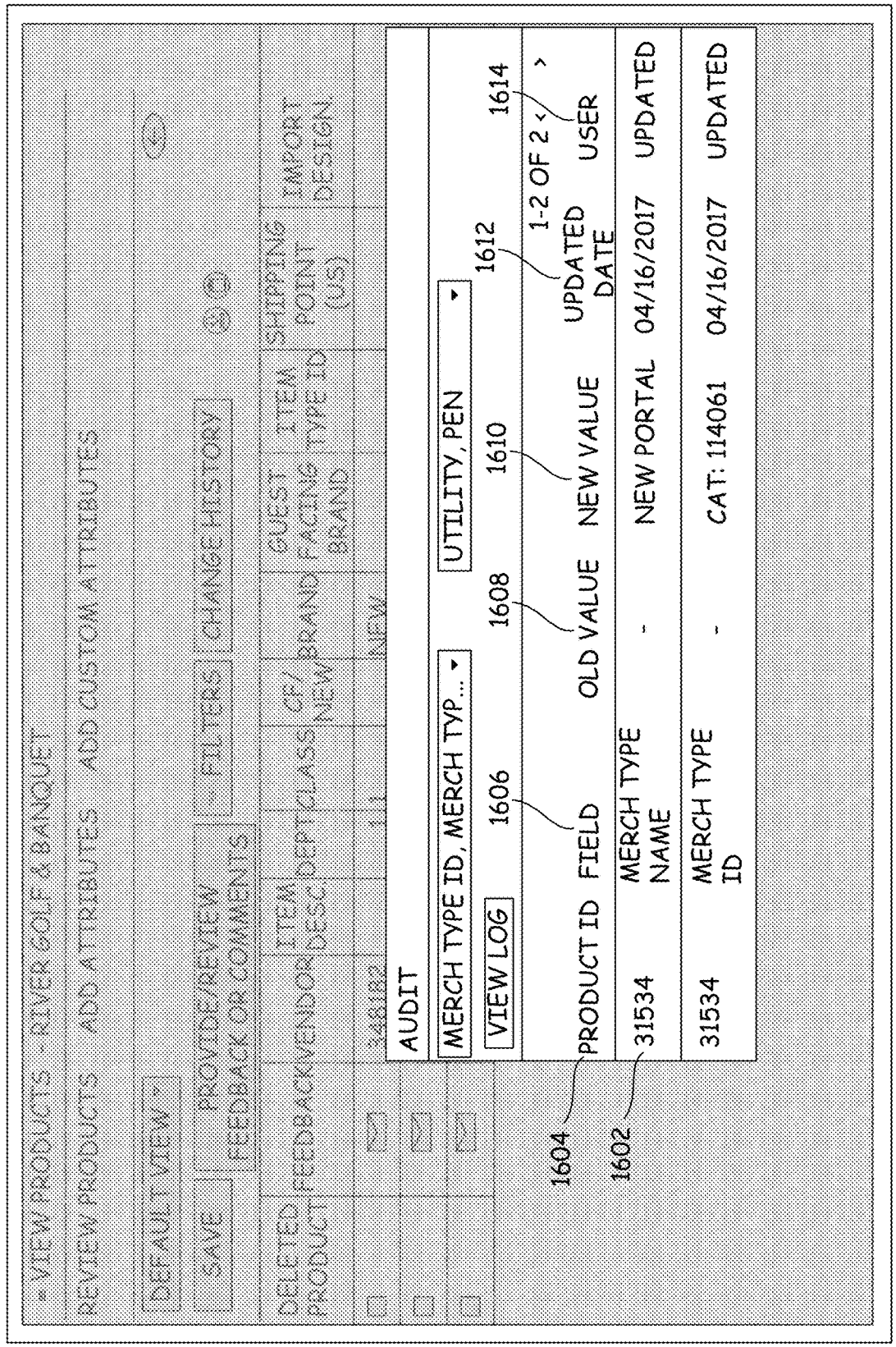
FIG. 16. is an example user interface showing a change history for attribute values.

FIG. 16 provides an example of a user interface 1600 showing a change history for selected attribute values. The change history includes a row entry, such as row entry 1602 for each change to an attribute value of a selected attribute heading. Each row entry includes a product identifier 1604, an attribute heading identifier 1606, an old value for the attribute 1608, a new value for the attribute 1610, a date the attribute was changed 1612 and the identity of the person who changed the attribute 1614. In FIG. 16, only the history for the current negotiation is shown. In accordance with other embodiments, the change histories for previous negotiations are also shown with an additional designation showing that the attribute value was provided as part of an earlier negotiation. This allows the purchaser to see the way in which the vendor has negotiated an attribute in the past to anticipate how the negotiations may proceed in the current negotiation.

Figure 17:
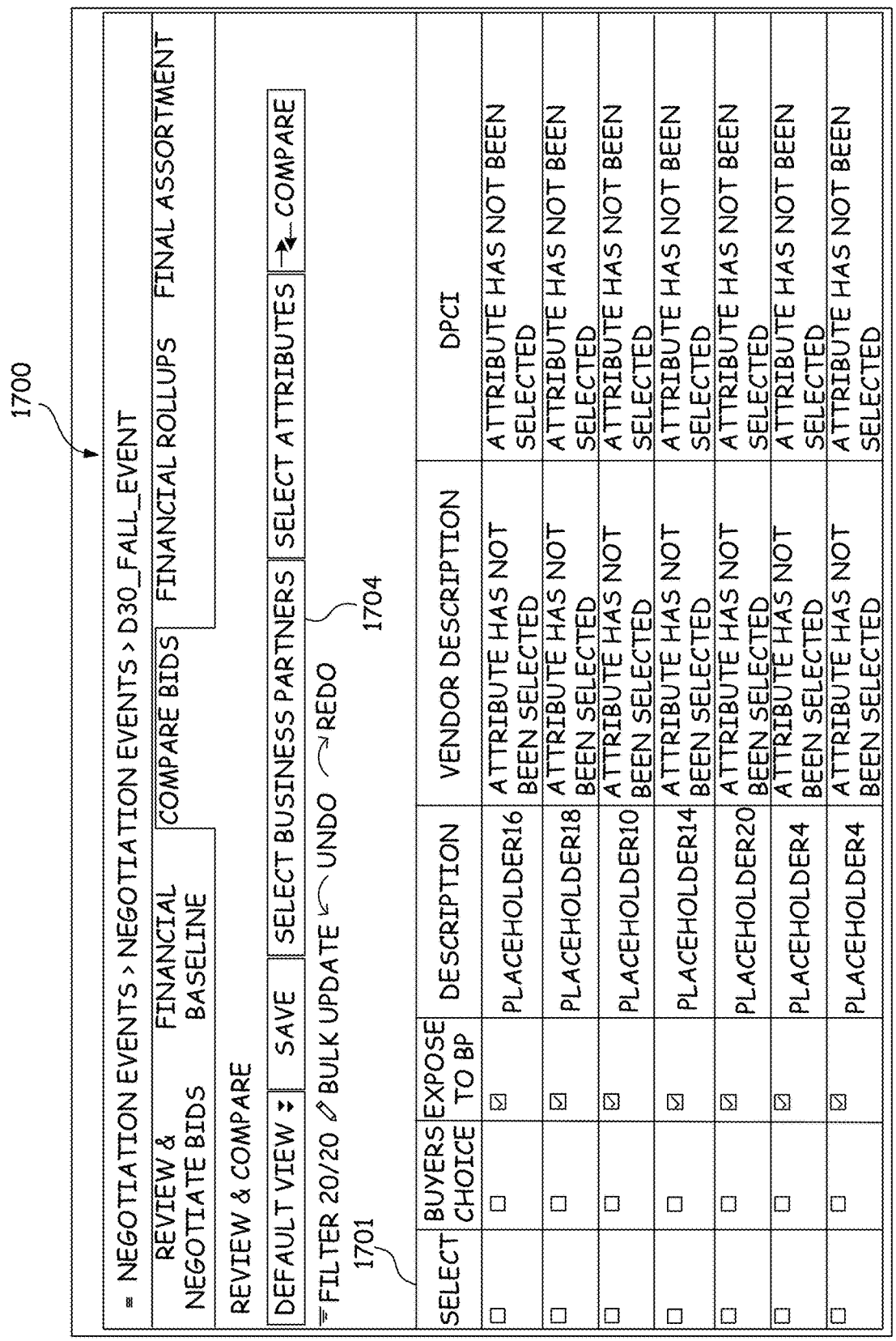
FIG. 17 is an example user interface used to select products for a bid comparison.

In accordance with some embodiments, the purchaser is able to request that negotiation server 102 provide a comparison of attribute values for selected attributes provided by selected vendors. FIG. 17 shows an initial compare bids user interface 1700, which includes a filtered list 1701 of products assigned to business partners/vendors that have been selected using Select Business Partners control 1704. The attribute values of the products shown in filtered list 1701 can be manipulated in the same way as the attribute values in product list 1001 of FIG. 10 including performing bulk updates of an attribute for all of the products displayed in filtered list 1701.

Figure 18:
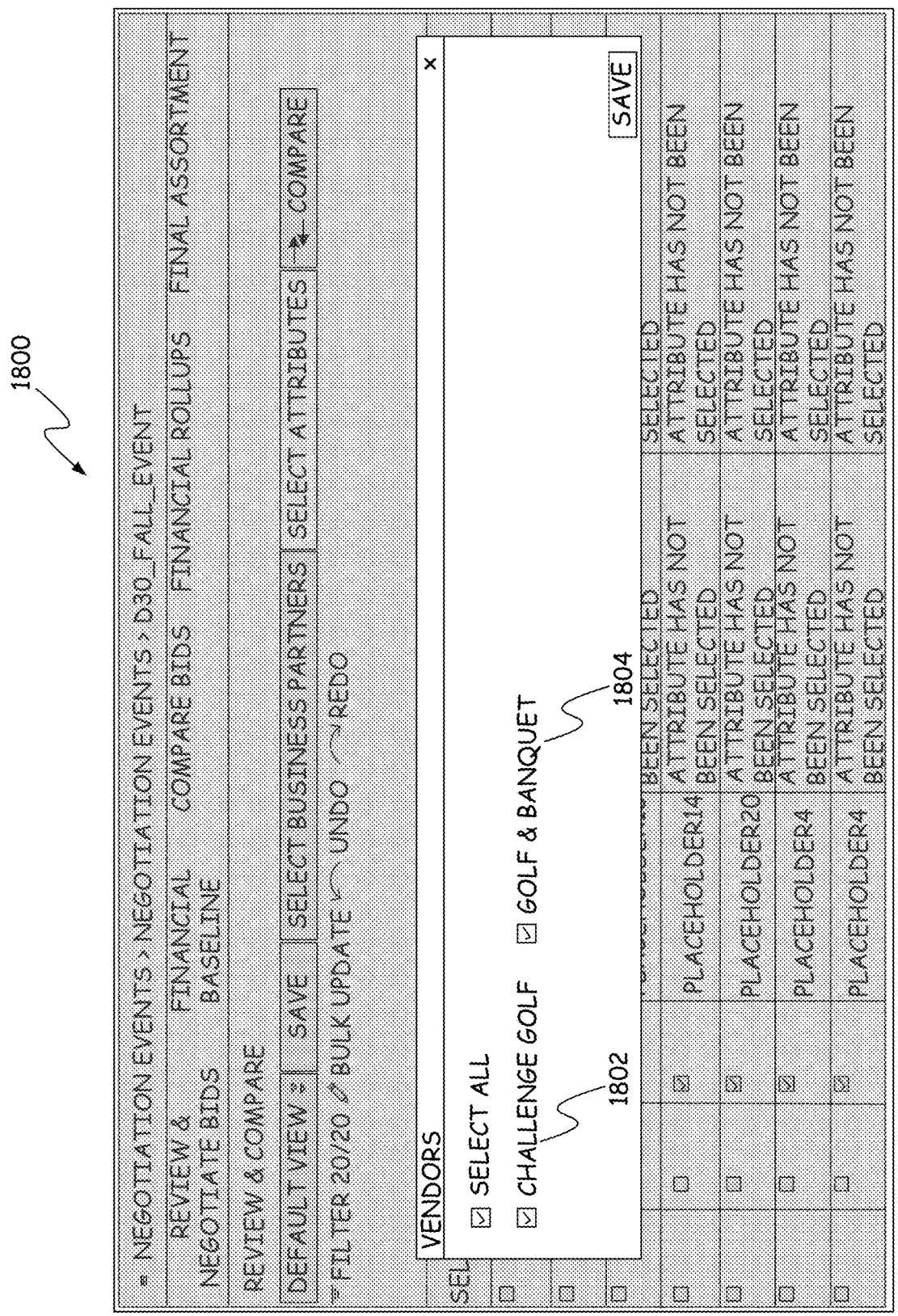
FIG. 18 is an example user interface for designating vendors for a bid comparison user interface.

FIG. 18 provides a user interface 1800 showing the selection of business partners/vendors to be used in the comparison user interface where checkboxes 1802 and 1804 are used to select the vendors. In FIG. 18, only the vendors who have previously been assigned to the negotiation event are displayed. FIG. 19 shows a user interface 1900 used in the selection of the attribute headings for which attribute values are to be compared. In user interface 1900, a list of possible attributes 1902 is displayed with a selectable checkbox next to each attribute heading, such as checkbox 1904.

FIG. 20 shows a user interface 2000 depicting the comparison of attribute values for selected attribute headings and selected vendors. Each attribute heading 2004 is shown in a separate row, which is then divided into sub-rows with each sub-row representing a separate business partner/vendor. For example, row 2010 is for attribute heading "FCA Factory City Unit Cost" and is divided into sub-rows 2006 and 2008 with sub-row 2006 for vendor RIVER GOLF & BANQUET and sub-row 2008 for CHANCE GOLF as indicated by the values in vendor column 2012. Each sub-row also includes the bid(s) provided for the attribute heading by the respective vendor of the sub-row. Each bid is shown in a product column, such as product column 2002, which is headed by the name of the product. Although only a single product column is shown in FIG. 20, if there were multiple products in the negotiation, a separate column would be provided for each part. The round of bidding during which the attribute value was provided is found in column 2014. If a vendor has not provided an attribute value for the attribute heading, the attribute value is left blank in the product column.

Figure 21:
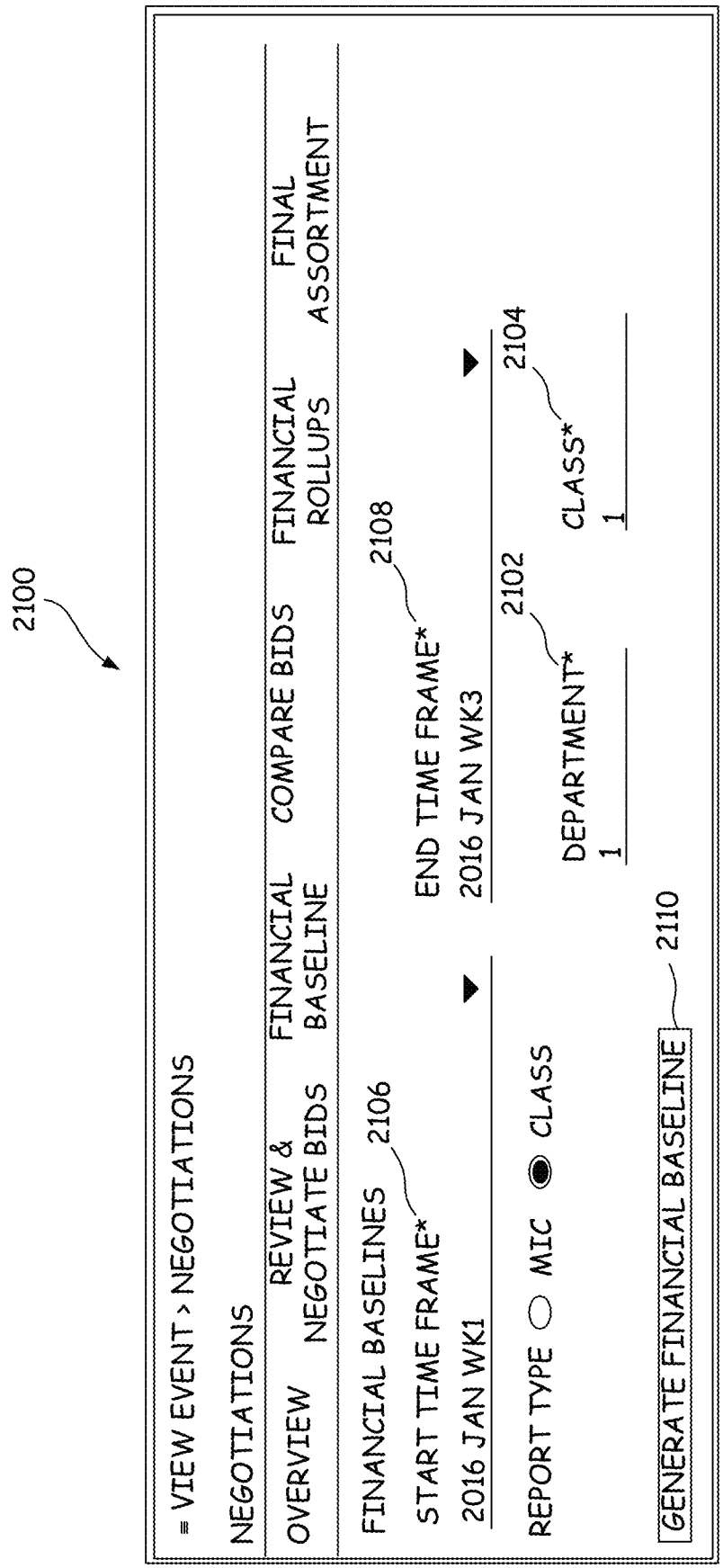
FIG. 21 is an example user interface for setting parameters for a baseline cost analysis.

In accordance with further embodiments, the purchaser is able to request financial baseline costs using an interface, such as user interface 2100 of FIG. 21. In FIG. 21, the user designates a department 2102 and a class 2104 and starting and ending dates 2106 and 2108. The user then selects control 2110 to request the baseline costs. The baseline costs provide the total cost that will be incurred over the time frame designated by the starting and ending dates if the current bids are accepted based on the per item cost, the number of items and the shipping cost.

In accordance with still further embodiments, financial metrics can be summarized for groups of products that have been marked using the Buyer's Choice selection described above. Thus, the financial metrics are limited to metrics determined from products that have been marked as Buyer's Choice. FIG. 22 provides a user interface 2200 showing summary values of certain financial metrics for four different groups 2202, 2204, 2206 and 2208. The financial metrics that are displayed are controlled by a view control 2210 that can be activated to select one of a collection of predefined metric sets. Each group's financial metrics can be broken down into subtotals based on a selected type of subgrouping set by a control 2212. In accordance with one embodiment, the Default subgrouping is by Business Partner/Vendor. To obtain the subtotals, a plus control, such as plus control 2214 is selected. FIG. 23 shows the effects of selecting plus control 2214 when the Default subgrouping is selected. As shown in FIG. 23, subtotals for each Business Partner/Vendor is shown for group 2202 after selecting control 2214. If a different subgrouping is selected using control 2212, different subtotals are shown when control 2214 is selected. For example, FIG. 24 shows the results of selecting control 2214 when the subgrouping type is by Department and then Class in control 2212.

After a number of rounds of bidding, the purchaser can finalize the negotiations using an assortment selection user interface 2500, shown in FIG. 25. In FIG. 25, each product in the negotiation is listed in a separate row entry and all possible business partners/vendors are shown in separate columns. By selecting a vendor for a row entry, the purchaser indicates that the vendor's bids are to be accepted as the results of the negotiation for that product. Bids from multiple vendors may be accepted for a single product. In addition, each business partner/vendor column includes a Select All Products control, such as Select All Products control 2502, that when selected causes all of the products associated with the business partner/vendor to be selected. Once the purchaser is satisfied with the vendor selections, they can select lock tab 2504 to lock their selection and to finalize the negotiation.

Once the negotiation is finalized, planning user interface 150 provides an Item Setup control 158 that can be selected to automatically generate a product entry in item database 106 that includes the attribute headings of the selected bid and the attribute values of the selected bid. Thus, the negotiated values for the purchase of the product do not have to be reentered by hand into the item database but instead are ported directly from planning/negotiation database 114 to item database 106 thereby removing errors that would otherwise occur if a human attempted to transcribe the information into item database 106.

Figure 26:
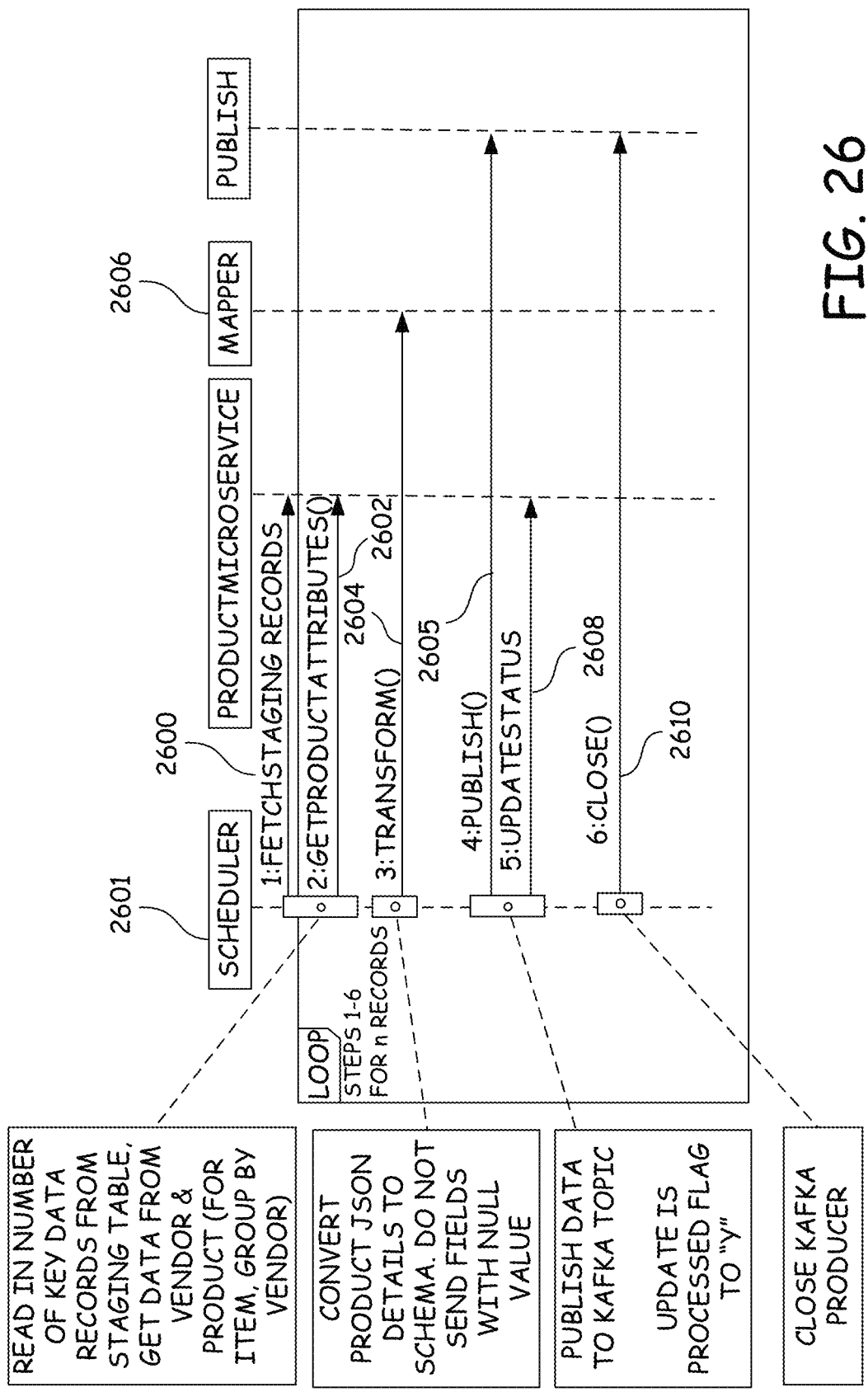
FIG. 26 is a swim diagram of a method of transferring negotiated attribute values to the item database.

FIG. 26 provides a swim diagram of a technique for transferring negotiated attribute values from negotiation database 114 to item database 106 in accordance with one embodiment. In step 2600, a scheduler 2601 in planning server 101 fetches records from a staging table to get data for a vendor and a product. At step 2602, the scheduler requests the attribute values stored in negotiation database 114 for the attributes associated with the product. At step 2604, the scheduler provides the retrieved data to a mapper 2606, which converts the retrieved data to a schema and returns the schema to the scheduler 2601. Scheduler 2601 then publishes the data as a Kafka topic at step 2605 and updates each product as processed at step 2608. When all the products and all the vendors for the negotiation have been processed, the Kafka producer is closed at step 2610. Each Kafka topic is provided to an external consumer in item server 104, which stores the data in the Kafka topic into item database 106.

Figure 28:
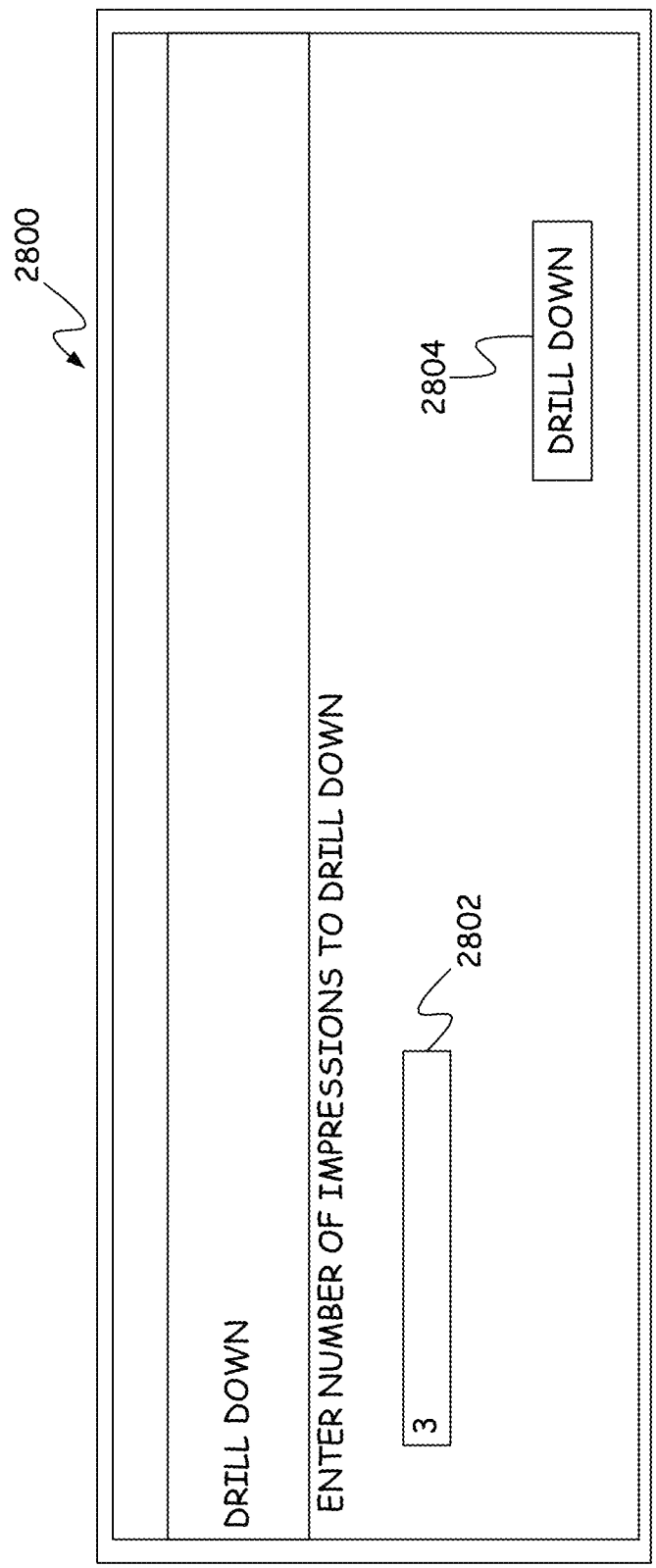
FIG. 28 is an example user interface for designating how many child products to form.

In accordance with a further embodiment, multi-tiered negotiation is supported where attributes can be negotiated at different aggregations of items. For example, attribute values can be negotiated for a style of clothing and then can be applied to all items of clothing of that style. FIG. 27 provides a user interface 2700 that allows for the creation of different tiers of item aggregation. In user interface 2700, a list 2701 of products defined for a negotiation event is displayed. At least one of the listed products represents multiple items that are to be sold. For example, a product in list 2701 can be 80's-style shirts that represents twenty different 80's style shirts that are to be sold in the store. Attributes that apply to all of the items in an aggregation, i.e. all of the 80's shirts, can be negotiated using the single product entry representing the aggregation. When these negotiations are completed, the product is used as a template for creating child products that each inherit the attribute values of the parent. For example, twenty shirt products can be formed as child products of the 80's-style shirt parent product and thereby inherit the attribute values negotiated for the 80's-style shirt product. To form such child products, the user first selects one of the products in list 2701 using a select control such as select control 2702. The user then selects Drill control 2704. In response, negotiation server 102 provides user interface 2800 of FIG. 28, which allows the user to designated how many child products (impressions) of the parent product are to be created using a text box 2802. The user then selects Drill Down control 2840 to create the child products. Once the child products are created, attribute values that were not negotiated for the parent product can be negotiated separately for each child product and, if desired, some of the previously negotiated attribute values of the parent can be renegotiated for one or more of the child products. A child product can also be selected to form a grandchild product that inherits all of the attribute values of the child product. Thus, any number of tiers of product aggregation can be formed for use in the negotiation.

Figure 29:
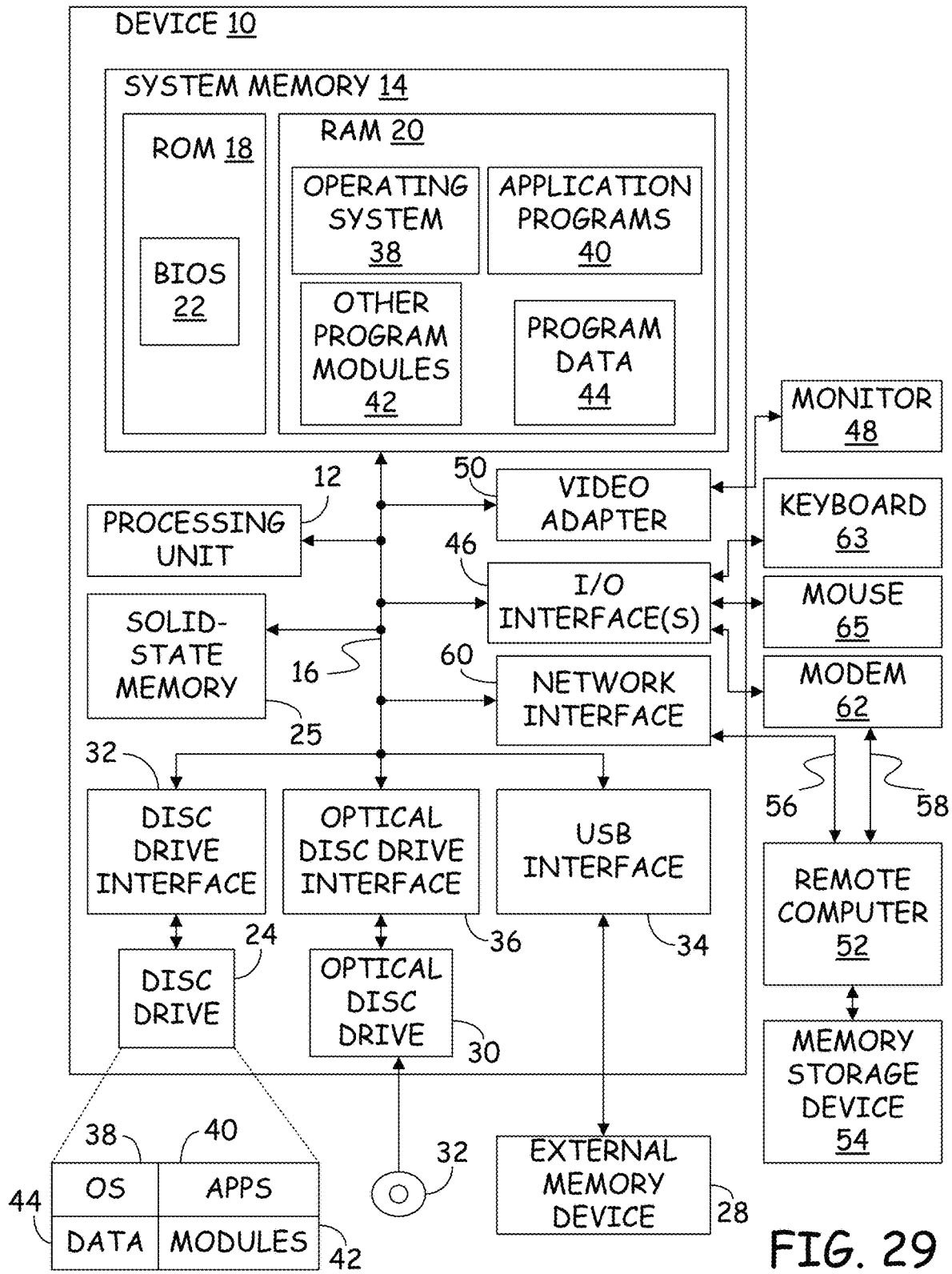
FIG. 29 is a block diagram of a computing system used in various embodiments.

FIG. 29 provides an example of a computing device 10 that can be used as a server device or client device in the embodiments above. Computing device 10 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes an optional hard disc drive 24, an optional external memory device 28, and an optional optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include processes and applications used to perform the operations discussed above, for example. Program data 44 can include all data stored in permissions 116, negotiation database 114 and item database 106, for example.

Processing unit 12, also referred to as a processor, executes programs in system memory 14 and solid state memory 25 to perform the methods described above.

Input devices including a keyboard 63 and a mouse 65 are optionally connected to system bus 16 through an Input/Output interface 46 that is coupled to system bus 16. Monitor or display 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 29. The network connections depicted in FIG. 29 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46. Order 206 is received through either network interface 60 or modem 62.

In a networked environment, program modules depicted relative to the computing device 10, or portions thereof, may be stored in the remote memory storage device 54. For example, application programs may be stored utilizing memory storage device 54. In addition, data associated with an application program may illustratively be stored within memory storage device 54. It will be appreciated that the network connections shown in FIG. 29 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A computer-implemented method comprising:
   receiving a plurality of attribute headings for a product and storing the product and the associated attribute headings in a negotiation database;
   receiving a request for products associated with a negotiation;
   in response to the received request for products, generating and sending a user interface listing at least one of the attribute headings for the product and providing controls for entering an attribute value for the listed at least one attribute heading;
   receiving an attribute value for the listed attribute heading as part of a bid during the negotiation and storing the attribute value in the negotiation database;
   receiving an indication that the negotiation is complete and in response locking the attribute value for the listed attribute heading in the negotiation database;
   receiving a control input requesting all attribute headings required to add a new item to an item database;
   storing additional attribute headings for the stored product in the negotiation database such that all attribute headings required to add a new item to the item database are stored in the negotiation database;
   receiving an attribute value for each of the additional attribute headings after the negotiation is complete; and
   receiving an instruction to create a new item in the item database and in response to the received instruction, sending a request to retrieve the locked attribute value and the attribute values for each of the additional attribute headings and to store the locked attribute value and the attribute values for each of the additional attribute headings in the item database used by retail systems to acquire information about products for sale in a retail enterprise.

2. The computer-implemented method of claim 1 wherein receiving the plurality of attribute headings comprises:
   receiving an identifier for a product in the item database;
   requesting all attribute headings and attribute values for the product from the item server using the identifier for the product; and
   receiving all attribute headings and attribute values for the product.

3. The computer-implemented method of claim 1 wherein receiving the plurality of attribute headings comprises:
   transmitting a selectable list of all attribute headings available for all products; and
   receiving an indication that a plurality of attribute headings in the list of all attribute headings has been selected for the product.

4. The computer-implemented method of claim 3 wherein receiving the plurality of attribute headings further comprises:
   receiving a request to define a custom attribute for the product;
   transmitting a user interface with controls to set parameters of the custom attribute including the attribute heading; and
   receiving the parameters of the custom attribute including the attribute heading.

5. The computer-implemented method of claim 1 wherein receiving an attribute value for the listed attribute heading as part of a bid during the negotiation comprises receiving the attribute value from a first vendor, the method further comprising:
   receiving a second request for products associated with the negotiation;
   in response to the received second request for products, generating and sending a user interface listing at least one of the attribute headings for the product and providing controls for entering an attribute value for the listed at least one attribute heading;
   receiving a second attribute value for the listed attribute heading from a second vendor as part of a second bid during the negotiation and storing the second attribute value; and
   receiving a request to compare the bid and the second bid and in response to the request transmitting a user interface showing the bid, the second bid, an identifier for the first vendor, and an identifier for the second vendor.

6. The computer-implemented method of claim 5 further comprising preventing the first vendor from viewing the second bid.

7. The computer-implemented method of claim 1 further comprising performing multiple rounds of bidding during the negotiation wherein each round of bidding comprises:
   receiving a respective request for products associated with the negotiation;
   in response to the received respective request for products, generating and sending a user interface listing at least one of the attribute headings for the product, a current attribute value for the listed at least one attribute heading and controls for altering the attribute value for the listed at least one attribute heading;
   receiving a new attribute value for the listed attribute heading as part of the round of bidding and storing the attribute value together with an identifier for the round of bidding.

8. The computer-implemented method of claim 7 further comprising:
   receiving a request to view a history of attribute values for an attribute heading;
   retrieving attribute values and a date when the attribute value was received; and
   transmitting a user interface showing a history of the attribute values for the attribute heading with each attribute value displayed with the associated date when the attribute value was received.

9. The computer-implemented method of claim 8 wherein the history of attribute values includes attribute values received for a prior negotiation.

10. A method comprising:
    receiving an indication that a negotiation for the production of a retail item has concluded;

locking stored attribute values for the retail item that were negotiated during the negotiation and that are stored in a negotiation database;

requesting all attribute headings required to add a new item to an item database that is used by a retail enterprise to provide information about retail items that are sold by the retail enterprise, wherein the item database was actively being used by the retail enterprise while the negotiation was taking place;

storing additional attribute headings for the retail item in the negotiation database so that all the attribute headings required to add the new item to the item database are stored for the retail item;

receiving and storing attribute values for each additional attribute heading in the negotiation database after the negotiation has concluded;

receiving an instruction to add the retail item to the item database; and in response to the received instruction, retrieving the locked attribute values and the attribute values added after the negotiation concluded from the negotiation database and using the locked attribute values and the attribute values added after the negotiation concluded to add the retail item to the item database.

11. The method of claim 10 wherein each stored attribute value is stored together with an indication of a round of bidding during which the attribute value was provided by a vendor.

12. The method of claim 11 further comprising before receiving the indication that the negotiation has concluded, receiving a request to view a history of attribute values for a particular attribute of the retail item and in response transmitting a list of attribute values for the particular attribute with each attribute value shown together with a date when the attribute value was provided.

13. The method of claim 12 wherein the history of attribute values comprises at least one attribute value provided during a prior negotiation.

14. The method of claim 11 wherein each stored attribute value is further stored together with an indication of which of a plurality of vendors provided the attribute value.

15. The method of claim 14 further comprising:
receiving a request to compare stored attribute values for an attribute that were received from different vendors; and
displaying the stored attribute values together with an identifier for a respective vendor that provided the stored attribute value.

16. The method of claim 10 further comprising:
at the start of negotiations, receiving an identifier for a retail item currently for sale by the retail enterprise;
using the received identifier to request attributes and associated attribute values for the retail item from the retail database;
transmitting the received attributes and associated attribute values as part of a user interface that includes controls for altering the associated attribute values; and
receiving modifications to the associated attribute value of at least one of the attributes during rounds of bidding in the negotiation.

17. A negotiation system comprising:
an item database server:
receiving requests for attribute values for attributes of products for sale by a retail enterprise; and
in response to the requests, retrieving stored attribute values from an item database and providing the retrieved attribute values;
a negotiation server:
providing user interfaces to facilitate multiple rounds of bidding during which attribute values for an attribute of a product are negotiated;
receiving an indication that negotiations are complete;
in response to the indication that negotiations are complete, locking current attribute values negotiated during the negotiation;
obtaining a list of all attributes required to add a new item to the item database;
obtaining additional attribute values for the product after the negotiations are complete so that the additional attribute values and the locked current attribute values together provide an attribute value for each attribute in the list of all attributes required to add a new item to the item database;
sending the additional attribute values and the locked current attribute values to the item database server for storage in the item database.

18. The system of claim 17 wherein during each round of bidding, the negotiation server stores an attribute value associated with the round of bidding and an identification of the round of bidding in a local database separate from the item database.

19. The system of claim 18 wherein the negotiation server further:
receives a request to view a history of attribute values for the attribute; and
in response to the request, provides a user interface showing a plurality of attribute values for the attribute, wherein each attribute value is displayed together with a date when the attribute value was provided.

20. The system of claim 19 wherein the user interface showing the plurality of attribute values includes attribute values received during a previous negotiation.

* * * * *

UNITED STATES PATENT AND TRADEMARK OFFICE
CERTIFICATE OF CORRECTION

PATENT NO. : 10,825,080 B2
APPLICATION NO. : 15/963723
DATED : November 3, 2020
INVENTOR(S) : Jayesh Shah et al.

Page 1 of 1

It is certified that error appears in the above-identified patent and that said Letters Patent is hereby corrected as shown below:

On the Title Page

Item (72) Inventors, add the following inventors:
--Vijayabaskar Ravikumar, Apple Valley, MN (US)
Jacob B. Wallestad-Dax, Brooklyn Park, MN (US)--

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*